United States Patent [19]

Karalus et al.

[11] 4,122,613
[45] Oct. 31, 1978

[54] OPERATOR RESPONSIVE AUDIO-VISUAL TEACHING APPARATUS

[75] Inventors: George C. Karalus, Arlington Heights; Robert R. Parker, Wheeling, both of Ill.

[73] Assignee: Bell & Howell Company, Chicago, Ill.

[21] Appl. No.: 761,566

[22] Filed: Jan. 24, 1977

[51] Int. Cl.² .............................................. G09B 3/00
[52] U.S. Cl. ..................................... 35/9 A; 353/19; 353/27 A; 274/41.6 S
[58] Field of Search ............... 35/8 A, 9 R, 9 A, 9 H, 35/35 C, 12 N, 12 Q; 274/41.6 S, 41.6 PP; 353/19, 27 A; 352/27; 179/100.3 B

[56] References Cited

U.S. PATENT DOCUMENTS

| | | | |
|---|---|---|---|
| 2,384,131 | 9/1945 | Price | 179/100.3 V |
| 3,191,315 | 6/1965 | Hannah | 35/9 A |
| 3,232,167 | 2/1966 | Schwartz et al. | 353/19 |
| 3,508,817 | 4/1970 | Hnilicka, Jr. | 352/27 |
| 3,510,209 | 5/1970 | Hnilicka | 352/27 |
| 3,521,379 | 7/1970 | Hannah | 35/9 A |
| 3,605,284 | 9/1971 | Kay | 35/9 A |
| 3,720,005 | 3/1973 | Roche | 35/8 A |
| 3,911,230 | 10/1975 | Neidell | 179/100.3 G |
| 3,932,948 | 1/1976 | Goddard et al. | 35/9 A |
| 3,964,826 | 6/1976 | Joseph et al. | 179/100.3 B |
| 3,992,092 | 11/1976 | Place | 35/9 A |
| 4,005,530 | 2/1977 | Takahashi et al. | 35/8 A |

Primary Examiner—Robert W. Michell
Assistant Examiner—Arthur S. Rose
Attorney, Agent, or Firm—John E. Peele, Jr.; Robert J. Schneider; James V. Lapacek

[57] ABSTRACT

A programmable, operator responsive, audiovisual teaching apparatus includes a rear screen projector for displaying visual information and an audio reproduction unit providing correlated audiovisual presentations in a sequence corresponding to a branched learning format. A microfiche storage element is provided with a plurality of informational units to be projected toward the screen, each unit including a visual portion, an encoded data portion, and an optical sound track portion. The coded data portion is projected onto a plurality of photodetectors mounted adjacent the screen and the optical sound track is projected onto a movable sound track transducer which provides the audio presentation. A plurality of manually operable switches are provided on the apparatus for selective actuation by the operator in an attempt to select a proper response to the audiovisual presentation. The photodetectors are connected to correlating circuitry which is operable in two modes, an auto step mode, in which the informational unit is presented and then automatically moved to present a sequential programmed informational unit, or a responsive mode, in which the informational unit is presented which requires an operator's response. In the second, responsive mode, upon a correct operator response, a subsequent informational unit is presented relating to a new subject, while, an incorrect response initiates a branching series designed to reinforce or further instruct the operator, after which the initial informational unit may be presented again. In one branching format, the apparatus projects the first of a plurality of possible branch informational units. In a second branch mode, the apparatus may select an appropriate single branch informational unit corresponding to the particular incorrect response.

46 Claims, 15 Drawing Figures

OPERATOR RESPONSIVE AUDIO-VISUAL TEACHING APPARATUS

BACKGROUND OF THE INVENTION

1. Field of the Invention

The present invention relates to operator responsive audiovisual teaching devices for presenting visual information and related audio messages and is particularly directed to such a device which may be programmed to present educational presentations in a sequence corresponding to a branched learning format.

2. Brief Description of the Prior Art

Many prior art audiovisual teaching devices are known, each of which is directed to solving a particular educational desire or requirement. One of the most popular forms of these devices are known as film strip projectors in which a series of visual and/or audio presentations are sequentially presented to an operator or student. In some of these devices, questions are presented to the student in which a correct answer is required before the device will proceed with additional, and sometimes more difficult, educational information. One such device is shown in U.S. Pat. Ser. No. 707,788 filed July 22, 1976, assigned to the assignee of the present invention. In these types of teaching devices, however, the apparatus does not have the versatility to reinforce or attempt to instruct a student with additional information in the event that a wrong answer is noted. While it is known that the interplay between the student and the instructor or instructional device is an important and beneficial ingredient in the educational process, it has also been found that, in certain instances, a student may require additional reinforcement or instruction when it appears that he is not sufficiently educated for a specific subject question. One solution to this problem is known as a sequence of instructions corresponding to a branched learning format. According to this format, when a particular presentation or question is not understood, as evidenced by a student's incorrect response, a sub-routine of one or more additional presentations is inserted into the sequence to reinforce and further instruct the student on a particular subject. Normally, the incorrectly answered question will then be re-presented to the student. One such device utilizing a branched learning format is shown in U.S. Pat. No. 3,942,269 utilizing a modified slide projector. This device, however, requires arrangement of the individual slides in a particular sequence, so that the presentation may proceed correctly. Obviously, any errors in the organization of the sequence will make the device inoperable.

SUMMARY OF THE INVENTION

Accordingly, an object of the present invention is to provide a programmable, operator responsive audiovisual teaching apparatus utilizing an improved record format.

Another object of the present invention is to provide a flexible, easily programmable audiovisual device in which a variety of programs can be interchanged.

Another object of the present invention is to provide a software programming format providing greater flexibility in an audiovisual device.

In accordance with these and other important objects, the preferred embodiment of the present invention provides a programmable, operator responsive, audiovisual teaching apparatus in the form of a microfiche projector which includes an audio reproduction unit providing correlated audiovisual presentations in a sequence corresponding to a branched learning format. A removable storage element is provided with a plurality of informational units, or frames, each of which includes a visual portion, a projectible encoded data portion, and an optical sound track portion. The coded data portion is projected onto a sensing means for control of the apparatus in accordance with the coded data. A movable sound track transducer traverses the projected image of the optical sound track and is connected to an amplifier means for providing the audio presentation.

A plurality of operator responsive selection means are provided for selective actuation by the operator in an attempt to select a proper response to the audiovisual presentation. The sensing means is connected to a control means for operation in at least two modes, an automatic mode, in which a predetermined informational unit is presented after which a sequential programmed informational unit is presented, or a responsive mode, in which a predetermined informational unit is presented and requires an operator's response before presenting a subsequent informational unit. In the responsive mode, upon a correct operator response, a subsequent informational unit is presented. An incorrect response initiates a branching sub-routine designed to reinforce or further instruct the operator, after which the predetermined informational unit may be again presented.

In one possible branching format, the apparatus projects the first of a plurality of possible branch informational units while in another possible branching format the apparatus projects a single branch informational unit corresponding to the particular incorrect response.

DESCRIPTION OF THE PREFERRED EMBODIMENT

Figure 1:
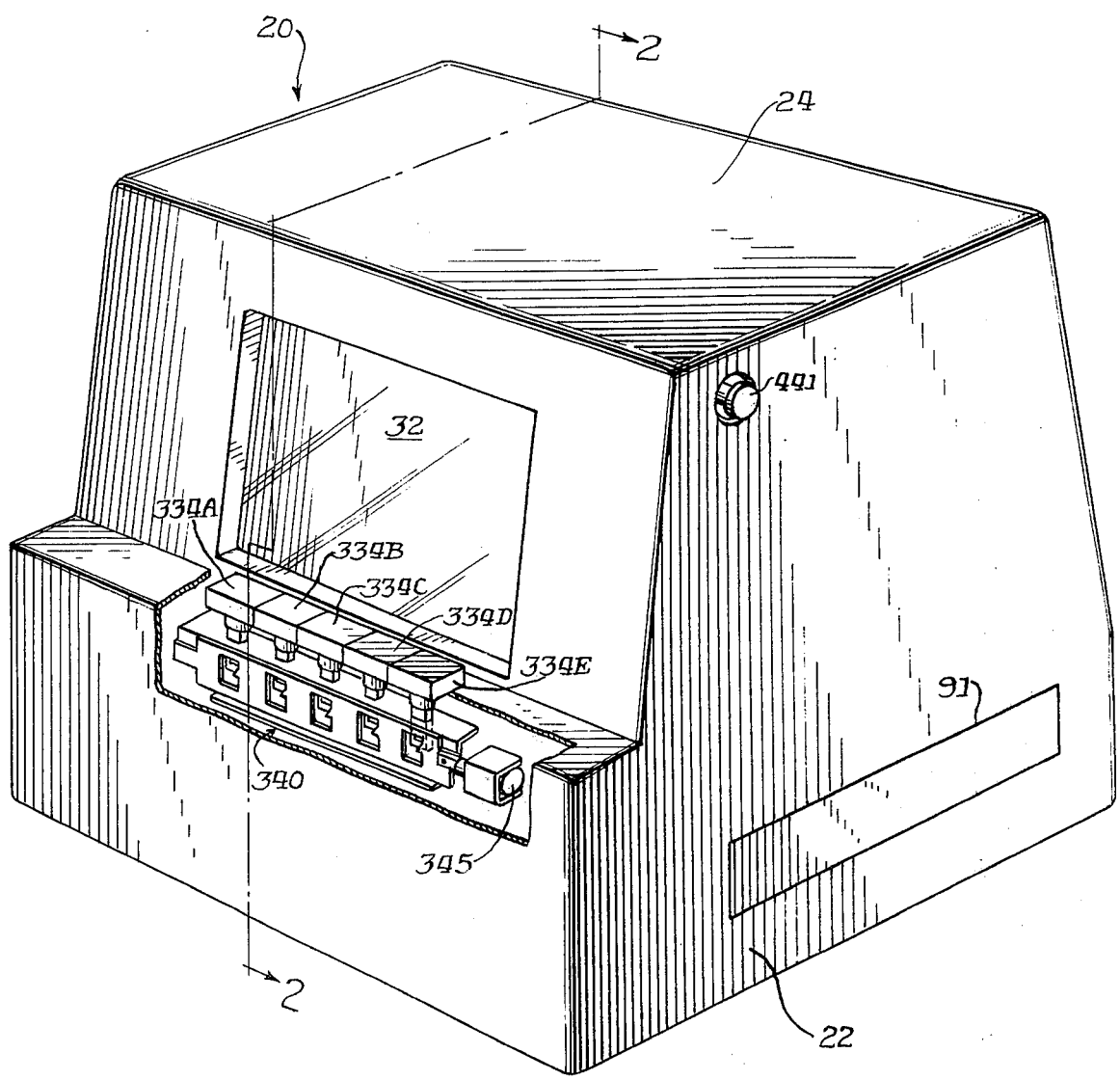
FIG. 1 is a perspective view of an audiovisual teaching apparatus embodying the concepts of the present invention.

An operator responsive audiovisual teaching apparatus embodying the concepts of the present invention is shown in FIG. 1, generally designated 20. The apparatus includes a generally rectangular lower frame portion 22 and an upper housing or cover portion 24. The lower frame portion is connected to a base plate 26 which includes four feet 30 for supporting the unit on a suitable supporting surface. The cover 24 supports a display or projection screen 32 at a slight angle with respect to the vertical for the convenience of the operator upon which visual images are projected from the rear. The projection system can be seen in FIGS. 2 and 3 to include a projection lamp 38 mounted by a base 40 to a projection lamp housing 42 mounted generally in the center of the base plate 26. The projection lamp is focused by a first lens 44 on the top of the housing through a microfiche storage element 50 (FIGS. 2 and 8) and through a second focusing lens 52 mounted to a horizontal flange 53. The image is projected onto a first small reflecting mirror 54 mounted on the top of the cover 24 by a pair of support flanges 56. The image is then reflected onto a larger, second reflecting mirror 58 supported by a similar pair of flanges 60 toward the rear of the cover. The second reflecting mirror 58 then projects the enlarged image onto the rear of the screen 32.

Figure 8:
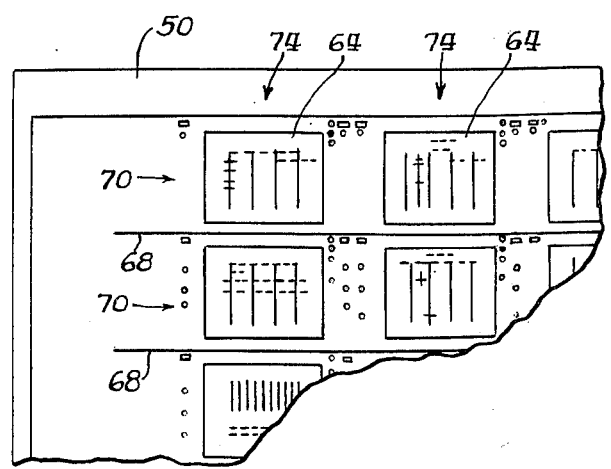
FIG. 8 is a partially fragmented plan view of a typical programmed microfiche storage element.
Figure 9:
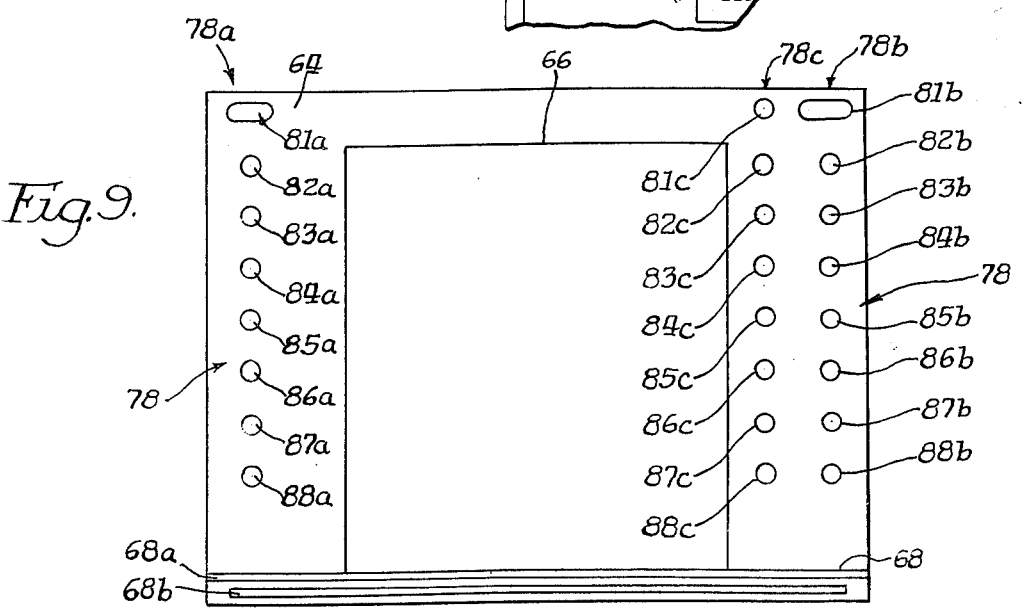
FIG. 9 is a plan view, on an enlarged scale, of one of the informational units shown in FIG. 8.

Referring to FIGS. 8 and 9, the microfiche storage element 50, more particularly, is typically a 4" by 6" rectangular acetate film sheet. The film includes a plurality of informational units 64, one of which is shown in an enlarged view in FIG. 9. Each informational unit includes a central portion 66 having a visual image imprinted thereon and an optical sound track 68 relating to the particular visual image 66. Each storage element 50, referring to FIG. 8, may include seven horizontal rows, generally designated 70, and seven vertical columns 74 of informational units 64 to provide a total of 49 informational units recorded or stored on each storage element. The optical sound track portions 68 relate directly to the visual image directly above the sound track 68 so that the audio and visual portions of the presentation cannot become unsynchronized.

The optical sound track portions 68 for a particular row 70 of informational units 64 is continuous across the horizontal length of the row extending beyond the respective ends thereof and is used for positionable alignment of the storage element 50 as will be described in further detail hereinafter.

In addition to the visual portion 66 and the optical sound track portion 68, each informational unit includes projectible encoded programs or data, generally designated 78. The encoded data 78, as shown in FIG. 9, includes three vertical rows of information 78a 78b and 78c. Each of the rows includes eight positions 81 through 88 which are either transparent or opaque depending upon the particular program. The two outermost rows 78a and 78b identify, in accordance with the programming scheme, the informational unit therebetween. The coded data in row 78c identifies the next informational unit in the sequence and also the correct response to the information presented by the present informational unit as will be described with respect to the programming portion of this disclosure.

Figure 2:
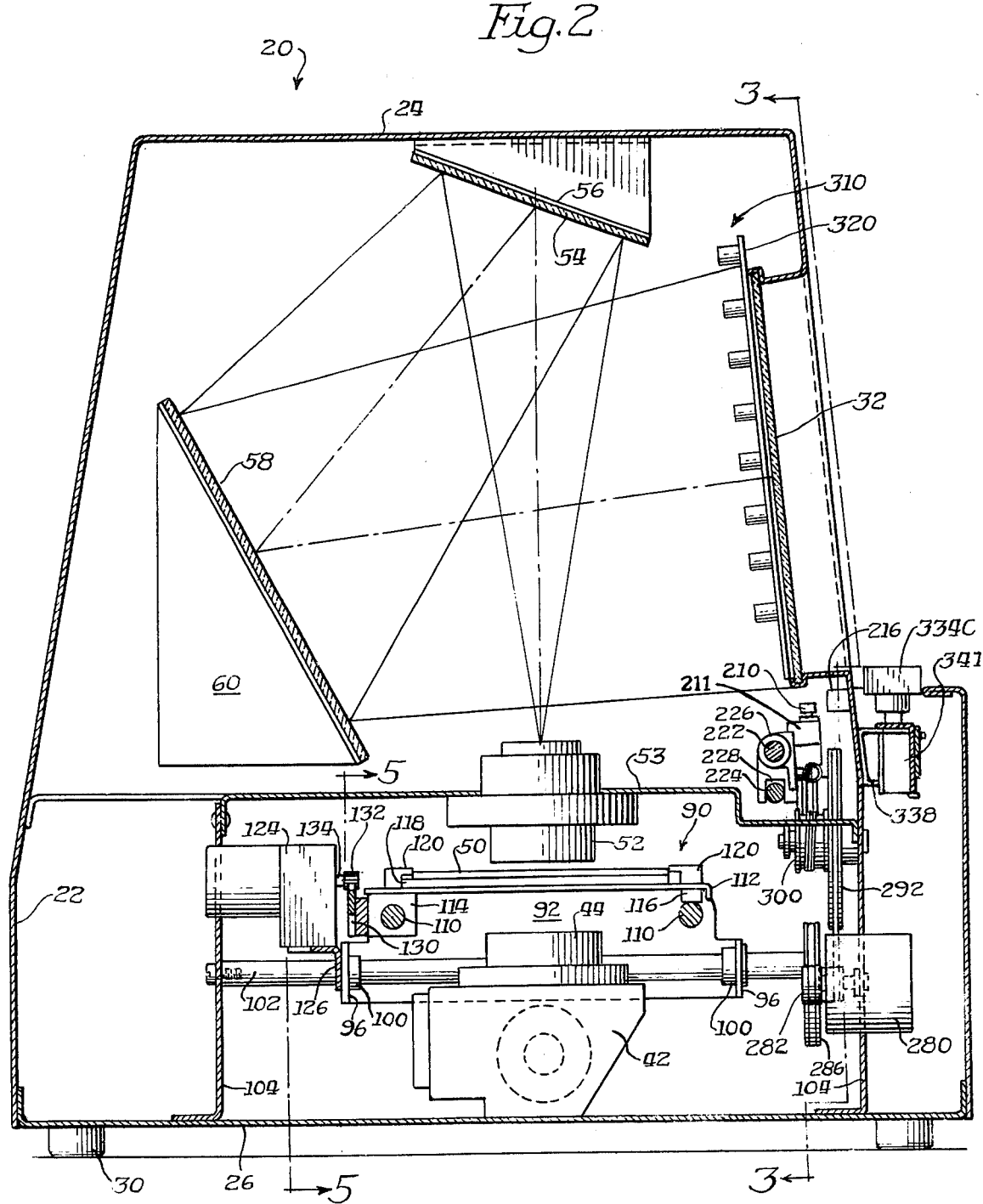
FIG. 2 is a vertical section taken generally along line 2—2 of FIG. 1.
Figure 3:
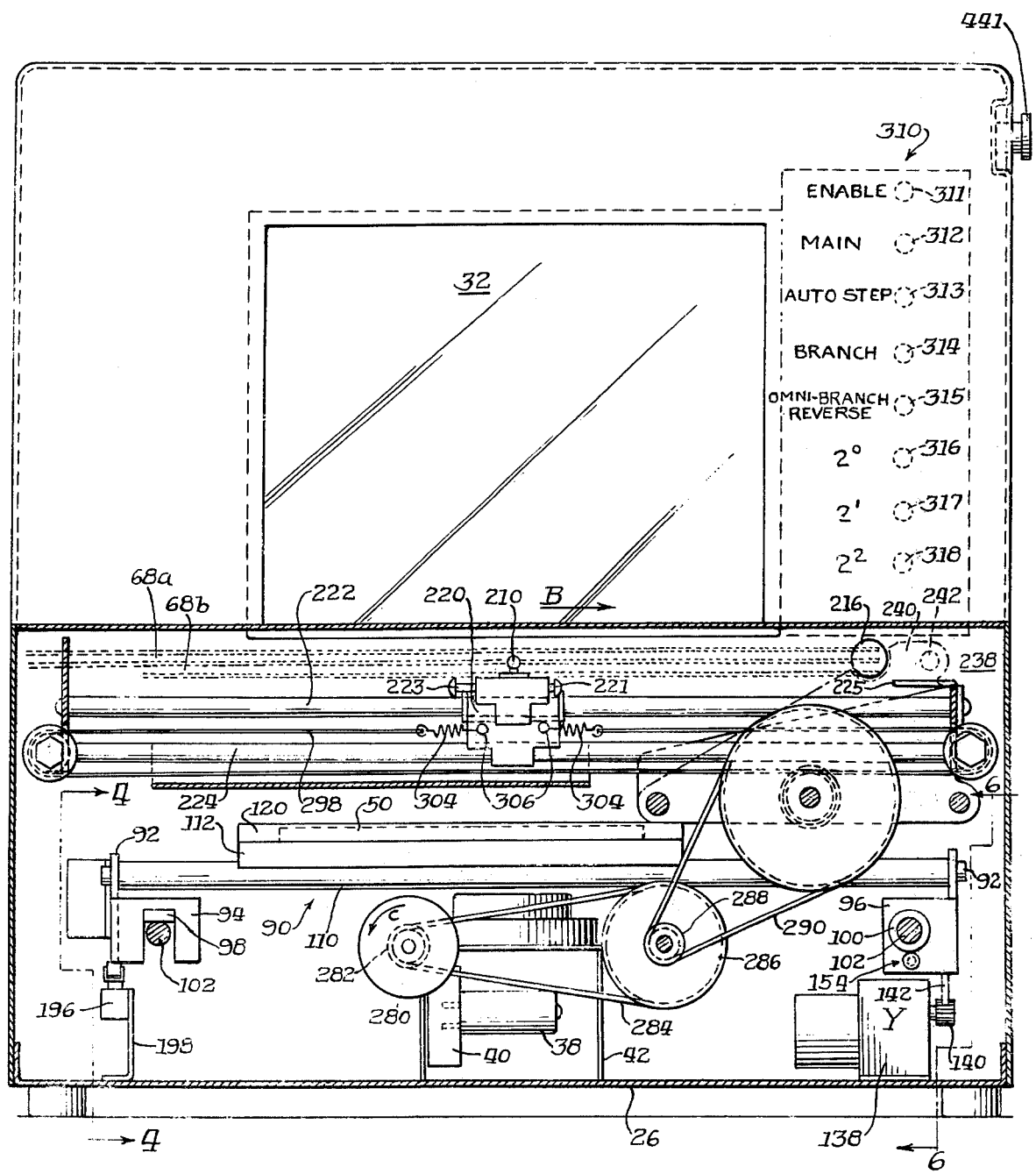
FIG. 3 is a another vertical section taken generally along line 3—3 of FIG. 2.
Figure 4:
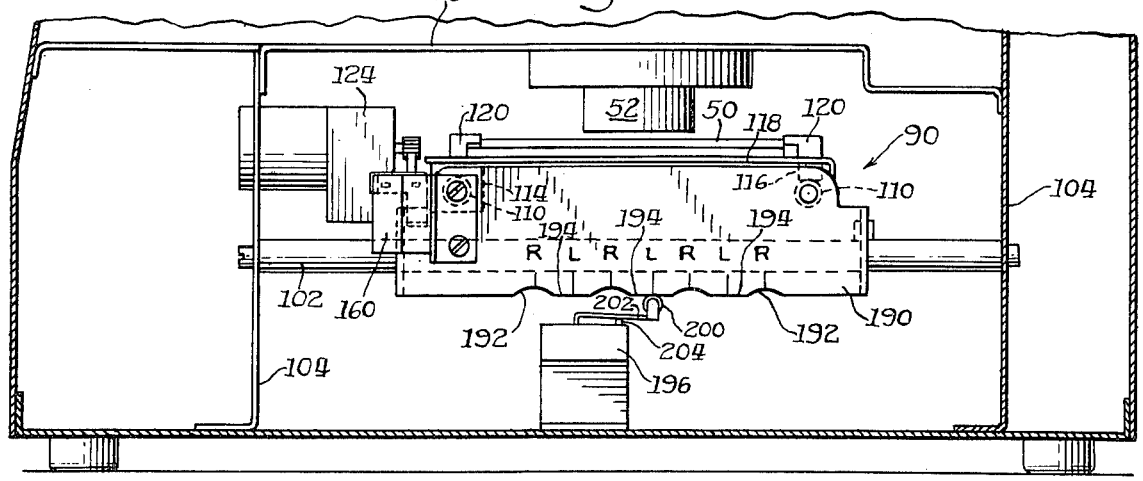
FIG. 4 is a partially fragmented, vertical section taken generally along line 4—4 of FIG. 3.

As described above, the storage element 50 is positioned between the lenses 44 and 52 for projection onto the screen 32. The microfiche storage element is mounted by a movable carriage means, generally designated 90, so that any one of the informational units 64 thereon can be projected onto the screen. The storage element 50 is inserted through a loading slot 91 on the side of the housing 22 onto the carriage 90. The carriage means includes a pair of each frame flanges 92 (FIG. 3) each of which is secured to a pair of guide rail supports 94 or 96. The guide rail supports 94 and 96 each include a bearing 98 and 100, respectively. The bearings 98 and 100 slidably engage a pair of Y-axis guide bars 102 mounted by front and rear flanges 104 (FIG. 4) within the frame 22. The righthand bearing, referring to FIG. 3, is circular and encloses the guide bar 102 while the lefthand bearing 98 is open and provides for vertical stabilization. Referring again to FIG. 3, the end frame flanges 92 mount a pair of similar X-axis guide bars 110. A generally flat mounting plate 112 is slidably mounted to the X-axis guide bars 110 by a similar pair of bearing supports 114 and 116. A central aperture in the plate 112 is closed by a horizontal sheet of transparent material 118 such as glass, or the like, for supporting the storage element 50 between the lenses as shown in FIGS. 2 and 3. A pair of L-shaped aligning guides 120 facilitate alignment of the storage element 50 on the transparent element 118.

An X-axis drive motor 124 (FIG. 2) is mounted between the frame members 92 by an L-bracket 126 (FIGS. 2 and 5) such as by screws 128. A gear rack 130 (FIGS. 2 and 5) is secured to the rearward guide support 114 in engagement with a pinion gear 132 secured to the X-drive motor shaft 134. Thus, to move the storage element in the X direction, the X-drive motor is energized by an appropriate DC voltage. Similarly, referring to FIGS. 3 and 6, a Y-axis drive motor 138 secured to the base plate 26 includes a pinion gear 140 mounted to its shaft which engages a rack 142 depending from the bearing supports 96.

Figure 6:
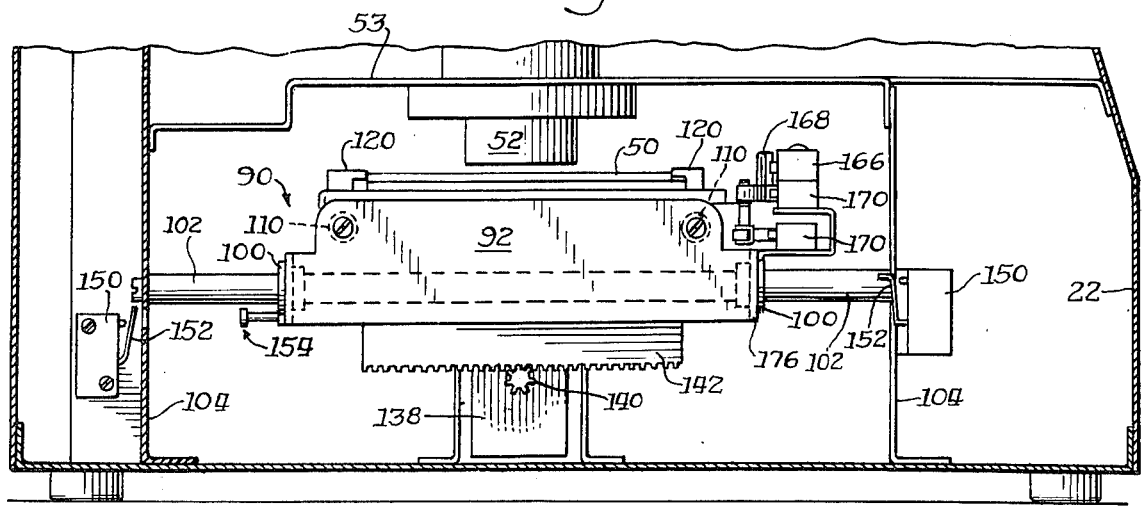
FIG. 6 is another partially fragmented vertical section taken generally along line 6—6 of FIG. 3.
Figure 13:
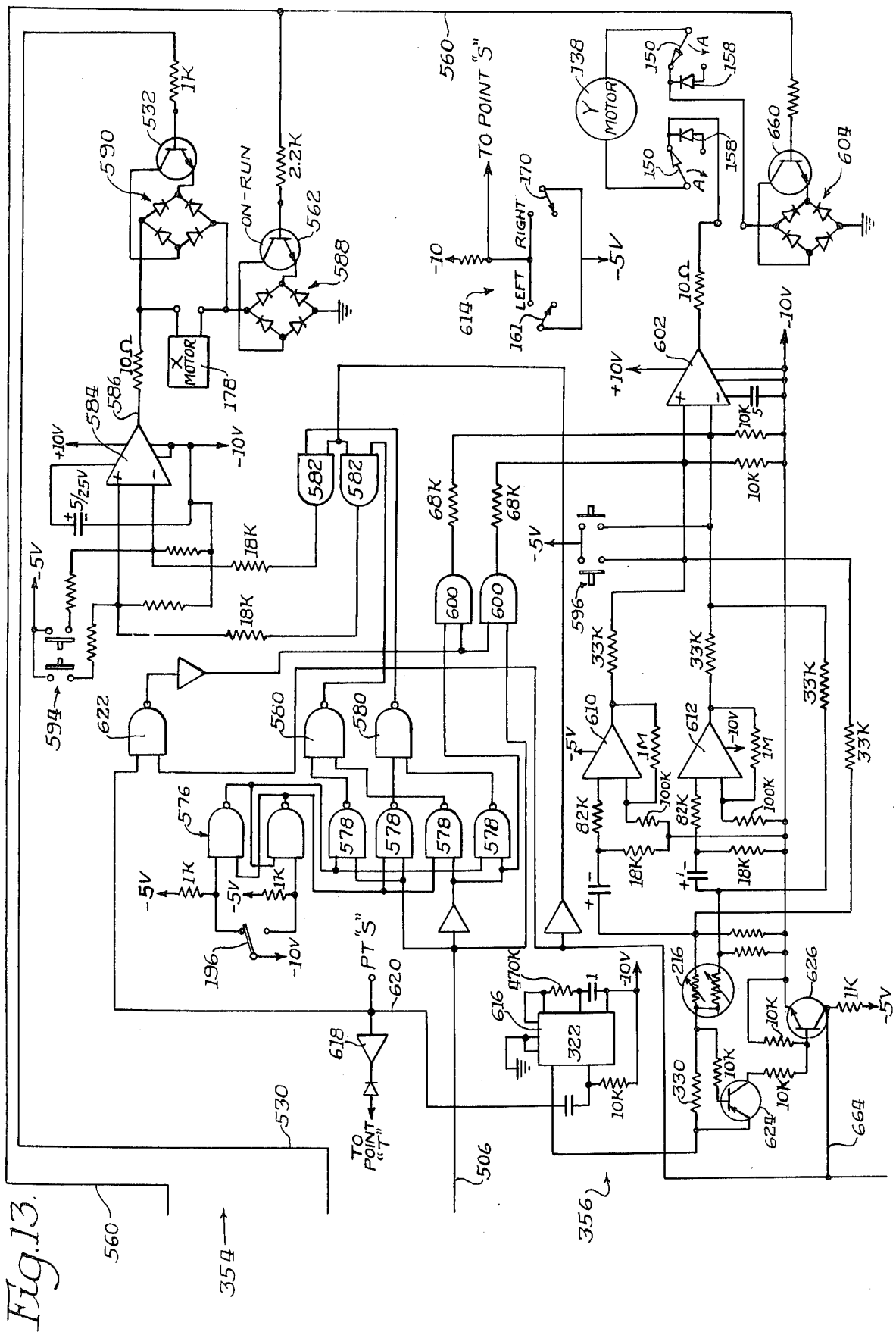
FIG. 13 is an electrical schematic drawing showing the X and Y drive motor circuitry of FIG. 10.

Referring to FIG. 6, and to the lower righthand corner of FIG. 13, a pair of limit switches 150 are mounted at opposite ends of the Y-axis path of travel of the carriage 90. As shown in FIG. 6, the small switch leaves 152 are biased outwardly so that the switches are connected to the Y-motor as shown in FIG. 13. However, referring to FIG. 6, when the carriage engages the leaf 152 on the righthand switch, or an adjustable switch trip 154 on the left of the carriage engages the lefthand switch leaf 152, the switch positions, referred to in FIG. 13, are moved as shown by the arrows A, to their second positions which insert the diodes 158 into the circuit which, automatically deenergizes the Y-axis motor 138 and permits energization thereof only by a current of opposite polarity which moves the carriage away from the limit switches 150 respectively.

Figure 5:
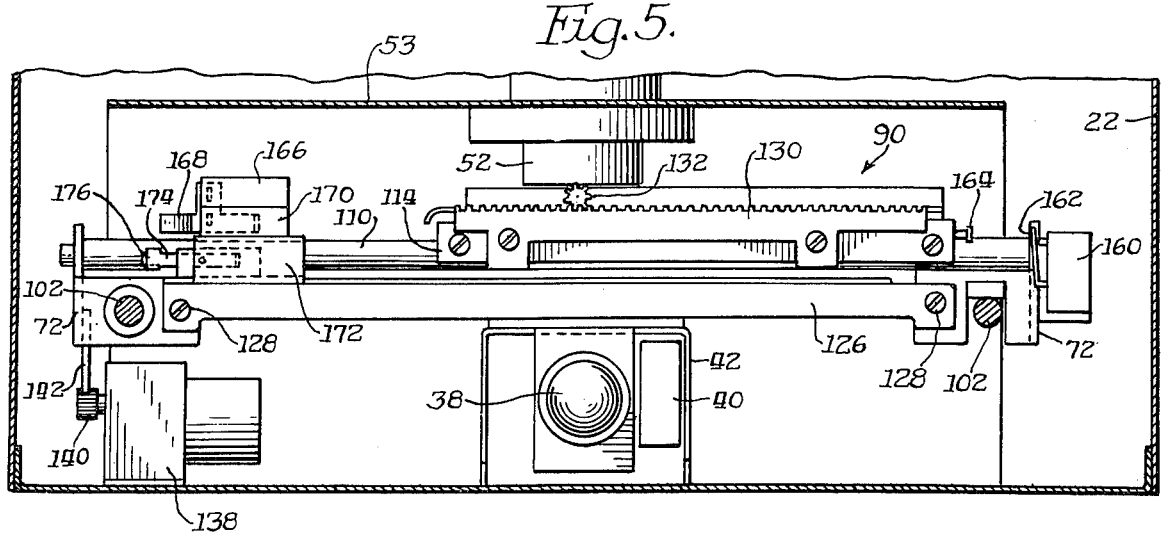
FIG. 5 is another partially fragmented, vertical section taken generally along line 5—5 of FIG. 2.

The X-axis drive motor 124 is connected to a similar travel limit switch 160, in the right of FIG. 5, having a leaf 162 which engages a switch trip 164 on the carriage. On the left, a limit switch 166 is tripped by a leaf 168 which engages the opposite end of the carriage. The leaf 168 also controls a second switch 170 which is described below. A further roller-type "load" switch 172 includes an actuator leaf 174 having a roller 176 for engagement with the carriage. The limit switches 160 and 166 are connected to the X-motor in a similar manner as shown in FIG. 13 with respect to the Y-motor, and the circuitry is represented by the block 178. Thus, the switches 150 for the Y-motor and 160 and 166 for the X-motor prevent damage to the device or the motor in an overrun condition and also preset the motors so that only a current of the correct polarity to drive the motor away from the respective switch is accepted.

As described previously, each storage element may contain up to 49 informational units 64 aligned in a seven by seven matrix. For efficiency, each horizontal row is read in one direction whereafter the carriage means 90 positions the next lower row in the X-axis and proceeds in the opposite direction, generally in a zigzag or serpentine fashion. Therefore, the "forward" direction of the sequence of informational units 64 is opposite for the alternating horizontal rows 70 of the storage element 50. Therefore, it is necessary that the logic system keep track of the particular row which is being projected. To this end, referring to FIG. 4, a cam plate 190 is provided on the lower end of the flange 92 having a plurality of low spots 192 and high spots 194. A cam switch 196 is mounted by a vertical flange 198 to the base plate 26 so that a cam following roller 200 engages the undulated cam surface of the pate 190. The roller 200 is mounted to a leaf 202 which engages the switch button 204 so that the switch 196 is always in one or the other position. In this manner, the polarity of the X-drive motor current is reversed for each succeeding horizontal row.

SOUND TRACK TRANSDUCER ALIGNMENT MEANS

Referring to FIGS. 8 and 9, each informational unit 64 includes a sound track portion 68 at the bottom thereof containing audio information related to the visual image 66 directly above the optical sound track 68. Each optical sound track contains an upper portion and a lower portion wherein the audio information is recorded in opposite directions. For example, referring to FIG. 3, one sound track 68 is shown as it is projected below the screen. The sound track includes a top portion 68a which is to be read by an optical sound track transducer 210 moving toward the right in the direction of arrow B and a lower sound track portion 68b which is to be read as the sound track transducer 210 moves in a direction to the left, opposite the direction of arrow B. The sound track portion 68a is continuous across the entire row of images on the storage element. When the storage element is placed on the carriage means 90, it is possible for the projected images to be slightly off from a perfect horizontal axis and therefore, a sound track transducer alignment means, generally designated 214 (FIG. 7), is provided to assure alignment between the sound track portions 68a and 68b with the path of travel of the sound track transducer 210. Any slight misalignment is hardly noticeable and will not affect the visual image projected onto the screen 32, however, the optical sound tracks are so narrow that any slight misalignment with respect to the path of tracvel of the transducer 210 will cause distortion and may give an unintelligible audio reproduction.

The Y-axis drive motor is controlled by a positioning cell 216 mounted to the flange 104. The positioning cell 216 operates the Y-axis motor so as to keep the projected optical sound track, on the lefthand end of the projected image (FIG. 3), aligned in front of the cell 216. This cell provides a righthand track alignment for the projected, righthand end of the optical sound track. The cell is de-energized briefly while the Y-axis drive motor is shifting between horizontal rows and the storage element will be discussed in greater detail hereafter, the positioning cell 216 also provides vertical alignment with respect to the horizontal rows 70 during movement of the storage element 50 in the X direction. The sound track transducer 210 in combination with the positioning cell 216 assure accurate tracking of the transducer with respect to the projected sound track image.

The sound track transducer 210 is mounted to a base 220 which is slidably mounted to a pair of transducer guide rods 222 and 224 by a circular bearing 226 and rectangular slot 228, respectively. The rods 222 and 224 are secured on their right ends to a pivotally mounted, generally triangularly shaped subframe 230. The subframe 230 includes a triangular front plate 232, a triangular rear plate 234 and a generally vertical end wall 236. The subframe 230 is pivotally mounted to a stationary frame flange 238 by an ear 240 and pivot pin 242. The front and rear walls 232 and 234 are secured to one another by appropriate spacers 244 and bolts 246. The opposite, or lefthand end of the guide bars 222 and 224 are secured to a generally vertical flange 248 which is slidably mounted by a shoulder screw 250 in a generally vertical slot 252 formed in the front flange 104 of the frame. The vertical plate 248 includes a forward extension 256, extending past the front of the flange 104, which carries a cam pin 258. The cam pin rides on a cam 260 drivingly connected to a cam motor 262 mounted by a reduction gear box 264 to the front of the flange 104. The cam 260 also engages a switch button 268 of a normally closed cycle low point switch 270. A spring 272 is connected between the tab 256 and a stationary tab 274 to maintain contact between the cam 260 and the cam follower pin 258. Thus, as the cam drive motor 262 is energized, the cam 260 will pivot the guide rods 222 and 224 so that the path of travel of the transducer 210 will coincide with the projected optical sound track 68.

In normal operation, the sound track transducer 210 is at rest at the lowermost point at the lefthand side of the guide bars 222 and 224 in a position below the left end of the projected optical sound track. As described above, as the Y-motor moves the storage element image, the positioning cell 216 stops the Y-axis motor upon alignment of the righthand end of the upper sound track image portion 68a. At this point, since both the positioning cell 216 and the sound track transducer 210 are in alignment with the projected sound track image 68a as the sound track transducer 210 scans the image, it will remain in perfect alignment therewith.

The sound track transducer 210 is caused to scan the projected sound track image by a scan motor 280 mounted in the flange 104. The scan motor includes a pulley 282 which is connected by a belt 284 to a larger pulley 286 pivotally mounted to the same flange 104. A conjointly mounted smaller pulley 288 through a drive belt 290 drives a larger pulley 292 rotatably mounted by a shaft 294 between the front and rear triangular plates 232 and 234. A drive line 298 is wrapped about a conjoint rotatable spool 300 and through a pair of generally outwardly mounted rollers 302 on the alignment means 240. The drive line 298 is connected at its opposite ends by a pair of springs 304 to a pair of studs 306 on the sound track transducer base 220. Thus, rotation of the scan motor in a counterclockwise direction as shown by arrow C in FIG. 3, drives the sound track transducer with respect to the projected optical sound track in the direction of arrow B as shown in FIG. 3. By reversing the scan motor 280, the sound track transducer moves in the opposite direction, back to its rest position.

Figure 7:
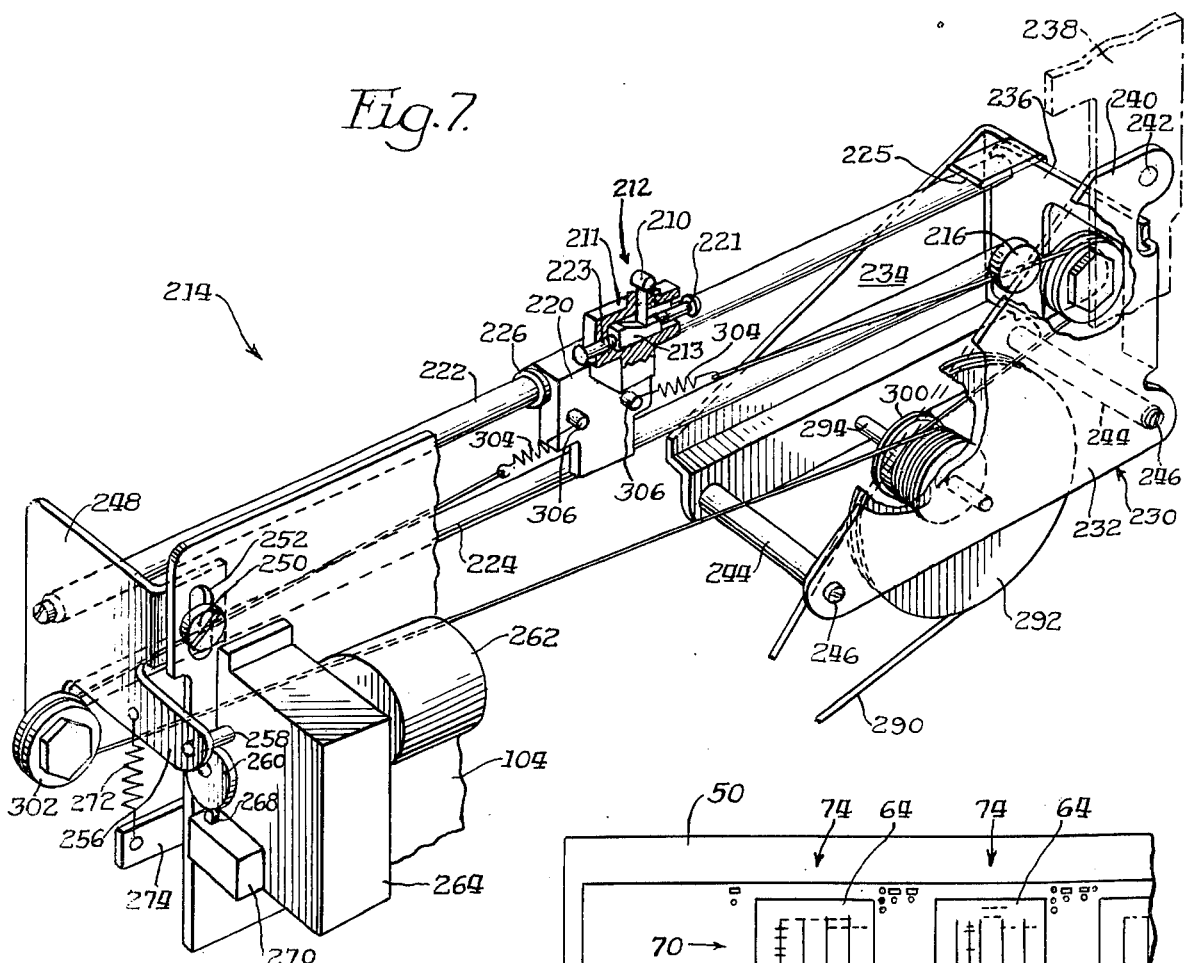
FIG. 7 is a partially fragmented perspective view of the sound track alignment mechanism.

The sound track transducer 210 is mounted within a frame 211 by an assembly 212. As the assembly 212 moves to the right, in the direction of arrow B, at the end of the upper sound track portion 68a, the sound track transducer assembly 212 moves in front of the positioning cell 216, thus cutting off any light received by the positioning cell. The transducer 210 is mounted within the assembly 212 on a vertical slide (not shown) which permits the transducer 210 to move up and down between the sound track portions 68a and 68b. Typically, on the assembly 212, the transducer 210 moves approximately 1/10th of an inch between its upper and lower positions. The sound track transducer 210 is moved between its positions by a cam member 213 (not shown). The cam member 213 is mounted within the frame 211 and slidable along a horizontal axis, generally parallel to the rod 222. A pair of end adjustment screws 221 and 223 are secured to opposite ends of the cam 213 and extend through the exterior of the frame 211 as shown in FIGS. 3 and 7. As the sound track transducer assembly 212 moves in front of the positioning cell 216, the right end adjustment screw 221 contacts a righthand stop tab 225. However, the assembly 212 continues to move to the right while the cam 213 is stationary. Therefore, the cam 213 moves with respect to the frame 211 and the cam surface causes the transducer 210 to move downwardly with respect to the frame 211 into alignment with the lower sound track portion 68b. As will be described in detail later, when the assembly 212 passes in front of the cell 216, a pulse is generated which reverses the direction of travel of the sound track transducer assembly 212 which then begins to move in the opposite direction. When moving toward the left, the sound track portion 68b is scanned in a reverse direction by the transducer 210. When the sound track transducer assembly 212 approaches the lefthand end of travel, the adjustment screw 223 engages the flange 248 which shifts the cam 213 back to its original position, thereby shifting the transducer 210 back to its upper position for reading the upper sound track portion 68a. Simultaneously, the sound track transducer base 220 engages the end of its travel, at the vertical flange 248. The additional current drawn by the scan motor is identified and terminates power to the scan motor, as will be described below, thus completing one audio scan or cycle.

SENSING MEANS

Figure 10:
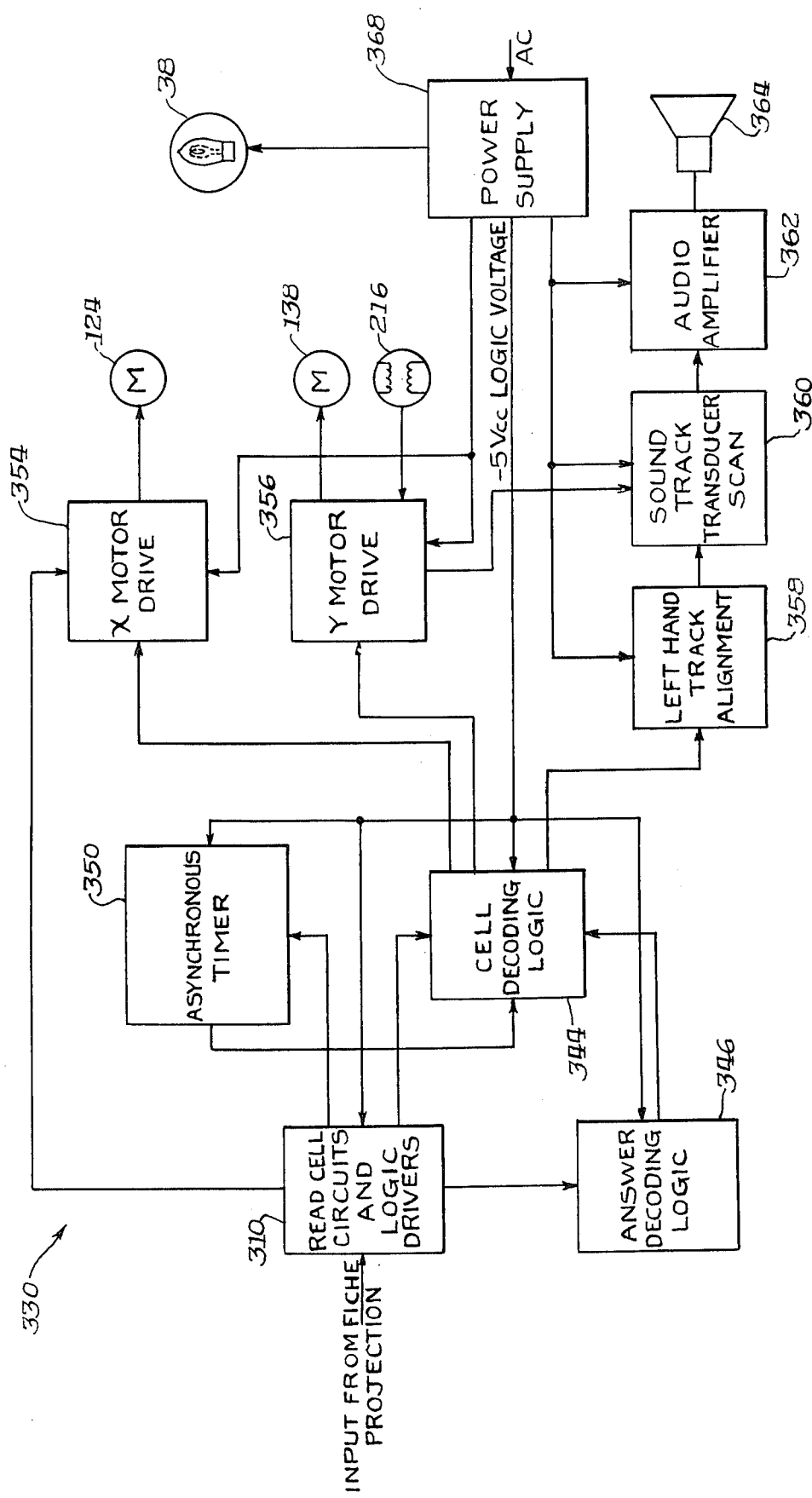
FIG. 10 is an overall block diagram of the control means for the audiovisual device of the present invention.

As described with reference to FIG. 9, each of the informational units 64 includes three vertical rows of coded data. The rows of coded data 78 are projected onto a sensing means, generally designated 310. The sensing means 310 comprises eight photodetectors 311 through 318 mounted on a generally vertical support plate 320 secured adjacent the right-hand side of the screen 232 as shown in FIG. 3. When an informational unit is in a position of rest, the middle coded row, 78c (FIG. 9), is projected onto the photodetectors of the sensing means 310. When the carriage is in movement, as driven by the X-axis motor, the photodetectors 311 through 318 read the outer code rows 78a or 78b, when the carriage is in a forward or reverse mode respectively. The readings of the outside rows 78a and 78b are ignored when the apparatus is in a reverse or forward mode respectively. The operation and coordination of the various components will be more clearly understood after a description of the programming for the storage elements 50 and the operation of the control means, generally designated 330 (FIG. 10).

PROGRAMMING FORMAT

The teaching apparatus 20 is generally operable in two modes. In a first mode, designated the "auto step mode", a visual image is presented on the screen in combination with an audio message related to the visual image. In this mode, after a brief pause at the end of the audio message, the apparatus moves on to the next predetermined frame. In a second mode of operation, a "response mode", a visual image is presented in combination with an audio message which requires the operator to select an appropriate answer. Referring to FIGS. 1 and 2, the teaching apparatus includes a plurality of response buttons or switches 334, designated 334a through 334e. The response button assembly is mounted by a bracket 338 to the flange 104 and includes a mechanical latch, generally designated 340 (FIG. 1), within the enclosure 341, which holds the selected button depressed. If the correct response button is selected and depressed by the user, the teaching apparatus proceeds to the next frame to repeat the cycle. In the event of an incorrect response, according to the coded data 78, the teaching apparatus may proceed to a "branch"0 frame. In one branch mode of operation, designated the "omni-branch mode", the teaching apparatus proceeds to the first branch frame in the scanning sequence. In a second, "branch" mode the teaching apparatus can select one of four possible branch frames related to the specific incorrect response of the user. After a branch frame is identified and projected onto the screen 32, referring to FIG. 14, a capacitor 343 is discharged through a solenoid 345. The solenoid 345 is connected to the mechanical switch lock 340 and releases the depressed button for a subsequent response.

According to the programming format, there are three types of informational units or frames. A "main" frame presents information and may or may not require an operator response. An "auto-step" frame is merely an instructional frame wherein information is presented and the apparatus automatically moves to the next programmed frame. Finally, a "branch" frame is used for the reinforcement of the main frame. If an incorrect response was selected on the main frame, the branch frame may be used to tell the correct answer, give more information, ask an easier question, or perform any other number of related tasks. The apparatus 20 may be programmed to proceed from a main frame to a branch frame, from a branch frame to another branch frame, from a branch frame to an auto-step frame, from a branch frame back to the initial or another main frame or other operations, all at the programmer's discretion. Main frames may have as many as four branch frames or as few as one and branch frames may be intermixed with auto-step frames to create subroutines within the program.

Referring to FIG. 9, each vertical row of coded data 78 includes eight positions which are either transparent or opaque, as determined by the programmer. The eight positions are identified by the following names. The topmost position 81 is an "enable" position which enables the other seven cells to read the projected encoded data. The next position 82 is designated "main" to identify a main frame. The next position 83 is designated an "auto-step" position to designate an automatic sequencing of the apparatus. The next position 84 is a "branch" position which identifies a branch frame. The next position 85 is an "omni-branch/reverse" position and the remaining three positions 86, 87, and 88 are the answer code in binary form, 2 to the zero power, 2 to the one power and 2 to the two power, respectively. As stated previously, the five answer buttons are designated 334a through 334e. The answer button 334a is a correct response to an informational unit 64 when only the 2 to the zero power is transparent. Likewise, the button 334b corresponds to a 2 to the one power, position 87, being transparent while 334c corresponds to both 2 to the zero power and 2 to the one power, positions 86 and 87, being transparent. Similarly, correct answer 334d corresponds to a 2 to the two power only, position 88, being transparent and answer 334e corresponds to both 2 to the zero and 2 to the two, positions 86 and 88 being transparent.

As discussed briefly above, the two end columns 78a and 78b of coded data are used to identify to the apparatus, the upcoming frame into which the apparatus is moving thus, when moving in either direction, one of these rows is encountered immediately upon entering the informational unit 64 and identifies what type of frame is present therein. The third row, 78c, of coded data is projected onto the sensing means 310 and utilized when the machine is stopped on a frame. This row of data, 78c, performs two functions, it identifies the next frame to which the apparatus is to proceed, and it also provides the correct answer response for this particular frame. The two outer rows 78a and 78b identify the upcoming frame and the answer codes 86, 87 and 88 identify a correct branch frame for a specific incorrect answer. Of course, if the apparatus is searching for an omni-branch frame, any branch frame will satisfy the condition.

The enable cell 311 controls the remaining cells 312 through 318 and permits them to accept data. FIG. 9 shows that the enable positions 81a, 81b and 81c are located above the visual image frame 66 and will only permit data to be projected onto the enable cell 311 at those various positions. The remaining cells 312 through 318 may receive projected light through the visual image 66 while a frame is traversing but the cells 312 through 318 will not accept the information since they have not been enabled. As will be described in greater detail below, the enable positions 81a and 81b are enlarged in a horizontal direction, since the apparatus is in a fast or rapid traverse mode, to assure sufficient time to enable the remaining cells.

The main cell 312 reads the encoded position 82a or 82b and indicates to the control means 330 that the upcoming frame is a main frame if this position is transparent, or that it is not a main frame if this position is opaque. If the apparatus is sequencing for a main frame, the X-axis motor will switch from a rapid traverse mode to a slow traverse mode and stop when the enable position 81c is aligned with the cell 311.

The auto-step cell 313 signals the control means 330 that the frame presently being projected is an auto-step frame if the position 83c is transparent. In this event, the visual and audio information will be presented and after a short delay, the apparatus will automatically move on to the next programmed frame without waiting for an operator repsonse.

The branch cell 314 reads the encoded data at positions 84a and 84b and signals whether or not the approaching frame is a branch frame. If it is a branch frame, the control means, then decides if the answer code associated with that frame matches the answer code representing the branch frame which the apparatus is seeking. If it is correct, the apparatus stops on that frame, however, if the anser code is not correct, the apparatus will continue to seek the correct branch frame.

The next cell 315, the omni-branch/reverse cell has a dual function. If the position 85c is transparent, and the apparatus is stopped on a frame, this signals the control means that the apparatus must go in reverse to the next frame. When the apparatus is traversing, and the position 85a or 85b is transparent, the upcoming frame will be identified as a branch frame which satisfies a branch condition regardless of the answer code. This is just the reverse of the branch frame above which requires a correct answer code in order to stop on a particular frame. This format allows programs to be set up so that there are four branch frames corresponding to specific wrong answers, for each main frame or with omni-branch, one branch frame that satisfies all wrong answers to a main frame.

As discussed previously, the remaining answer cells 316, 317 and 318 identify the correct answers A through E. The answer cells perform a function at two different times on a specific frame. On a branch frame, they signal the logic that the answer code of the approaching frame is correct for a stop on that frame and these cells also identify the correct operator response to a frame that is being projected. Referring to FIG. 9, therefore, positions 86c, 87c and 88c identify the correct answer for a particular informational unit 64 while the positions 86a, 86b, 87a, 87b and 88a, 88b indicate whether or not the upcoming frame is the corresponding branch frame for a particular incorrect response.

CONTROL MEANS

Figure 14:
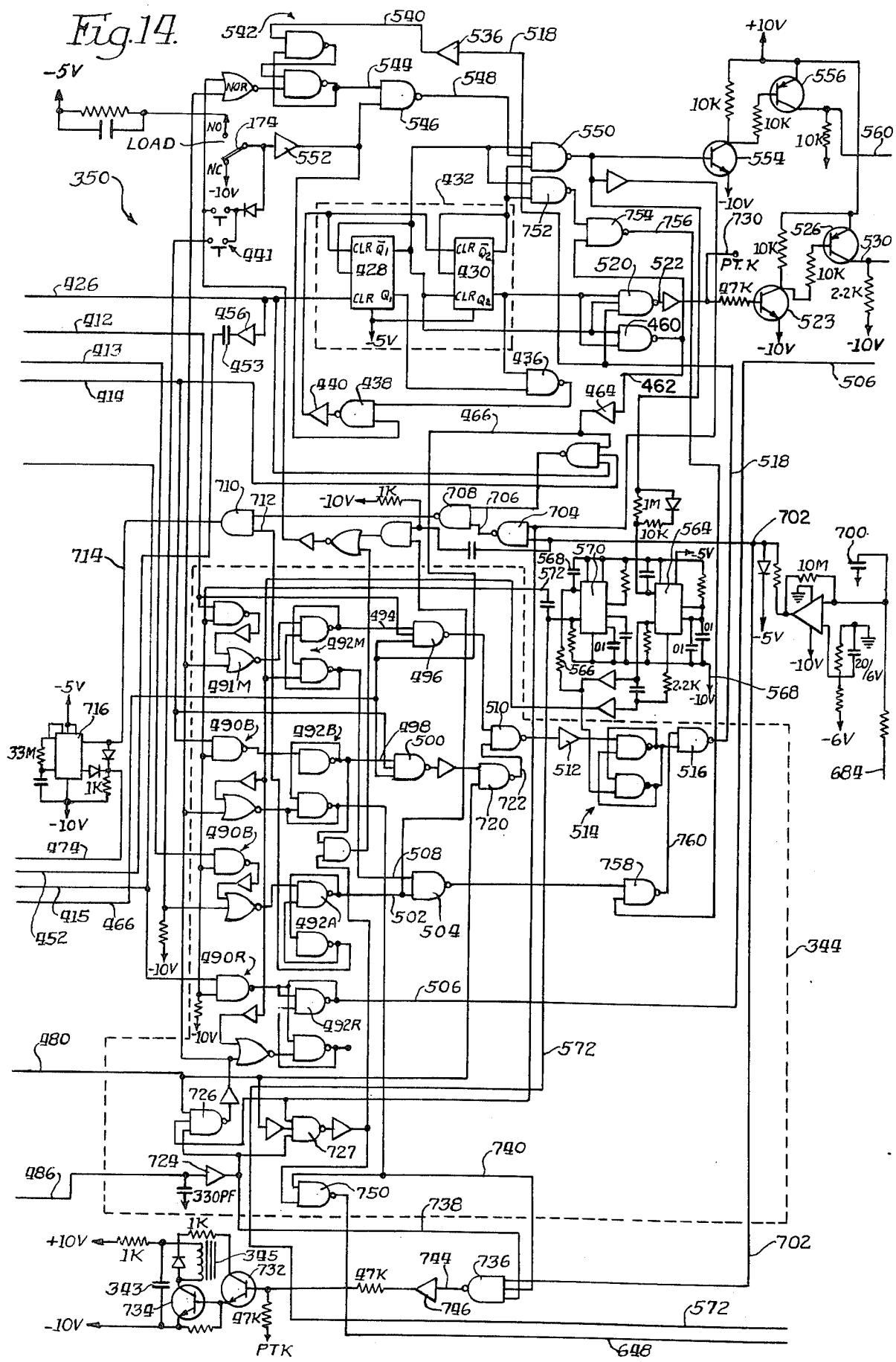
FIG. 14 is an electrical schematic diagram showing the asynchronous timer and cell decoding logic circuitry of FIG. 10.

The control means 330 is shown in block diagram in FIG. 10 comprising basically TTL logic circuitry including the following elements. The sensing means 310 includes the read cell circuitry and logic drivers, a cell decoding logic unit 344, an answer decoding logic unit 346, and an asynchronous timer 350 which controls the various apparatus functions. The asynchronous timer 350 produces pulses within the apparatus that are not necessarily coincident with other apparatus functions. This timer 350 was chosen in lieu of a conventional "clock" circuit because it would be difficult to synchronize the machine action because of the different motor speeds for the X and Y axis drive motors. The movement of the storage element 50 within the apparatus, in combination with the asynchronous timer 350 performs the entire timing function. The control means further includes an X-motor drive circuitry 354, a Y-motor drive circuitry 356 which drive the respective motors 124 and 138. A lefthand track alignment circuit 358, sound track transducer scan circuit 360 and audio amplifier 362 provide the audio output through a speaker 364. A power supply 368 provides the necessaery power to drive the control means 330. Referring to FIGS. 11 through 15, the sensing means 310 is shown generally in FIG. 11 and the answer decoding logic circuitry 346 is shown in FIG. 12. The cell decoding logic unit 344 is shown within the bottom center of FIG. 14 within the dash lines while the remainder of FIG. 14 shows the electrical schematic of the asynchronous timer 350. The X-axis motor drive circuitry is shown generally in the top of FIG. 13 and a Y-axis motor drive circuitry is shown generally in the bottom of FIG. 13 below th AND logic gates designated 600. The lefthand track alignment circuitry 358, the sound track transducer scan circuitry 360, the audio amplifier 362, and the power supply 368 are shown generally within rectangular outlines in FIG. 15.

Figure 15:
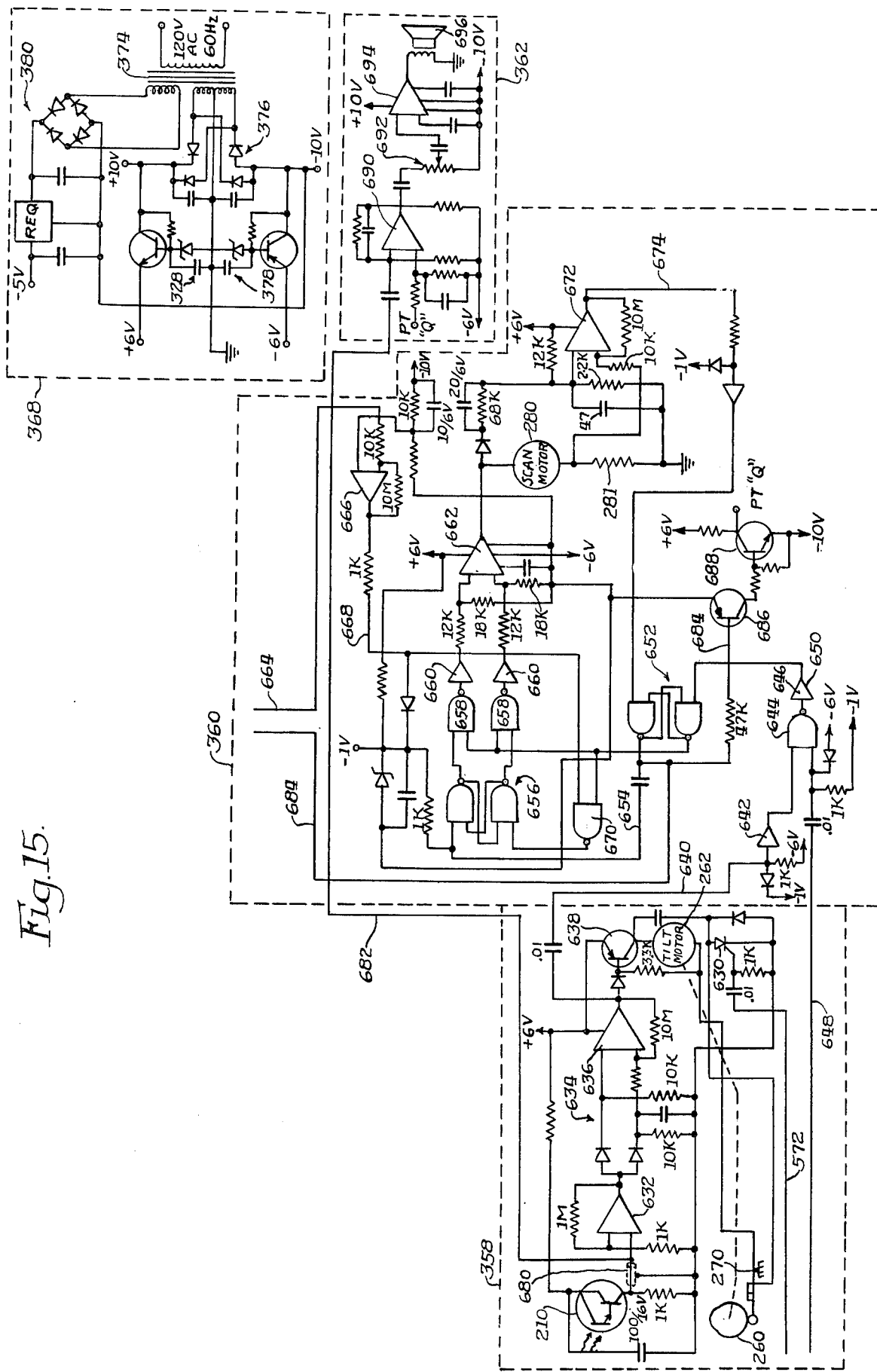
FIG. 15 is another electrical schematic drawing showing the track alignment, audio cell scan, audio amplifier, and power supply circuity of FIG. 10.

The power supply 368 includes a transformer 374 having two secondary coils supplying 300 ma AC each. When the primary coil is connected to a 120 volt AC 60 cycle source, a plurality of standard diodes 376 provide a plus and minus 10 volt DC supply as indicated. A pair of series regulating filters 378 provide a plus and minus 6 volt supply for the sound track transducer circuits and scan motor 360. A minus 5 volt regulator, generally designated 380, provides a minus 5 volt VCC power to the logic circuitry. Another transformer, not shown in FIG. 15, provides power for the projection lamp 38 and a lamp cooling fan.

Figure 11:
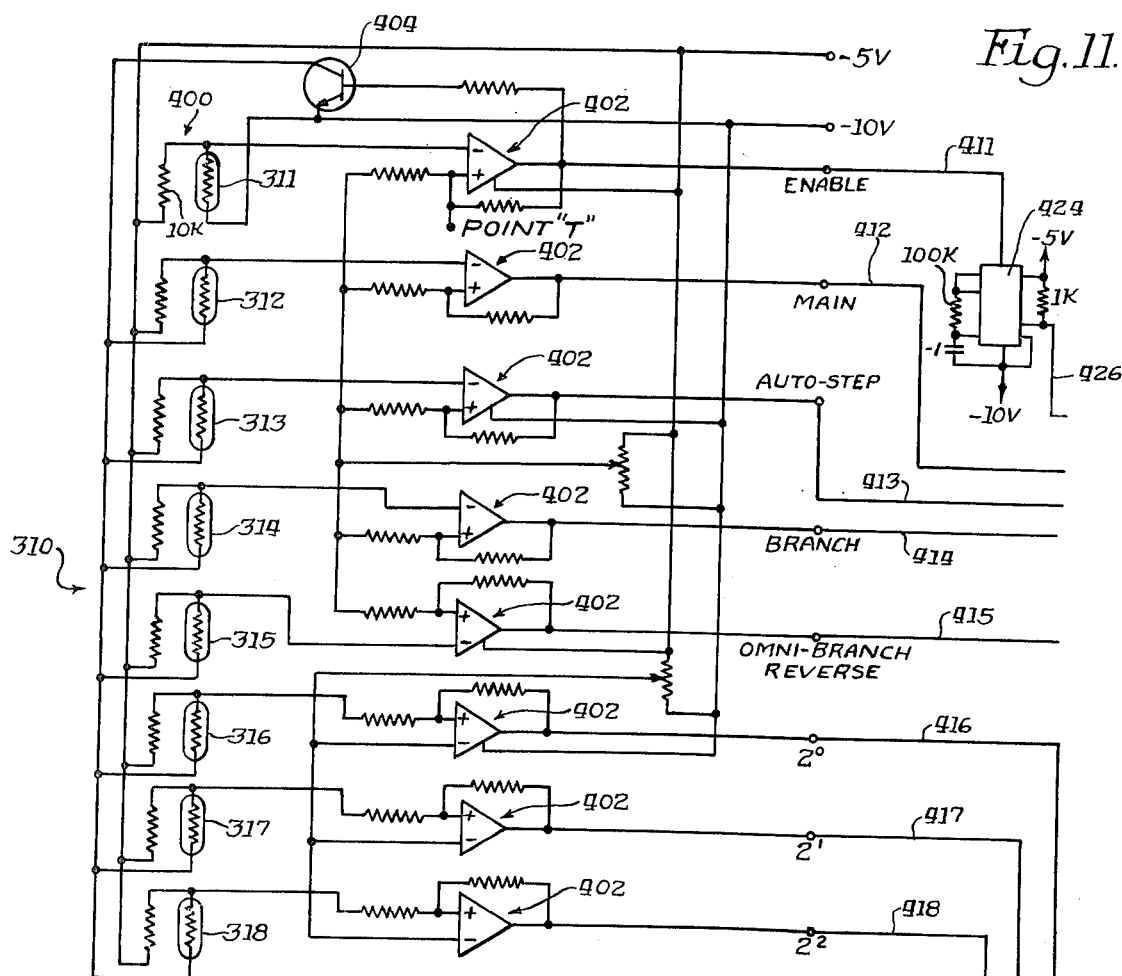
FIG. 11 is an electrical schematic showing the photodetector circuits and logic drivers of FIG. 10.
Figure 12:
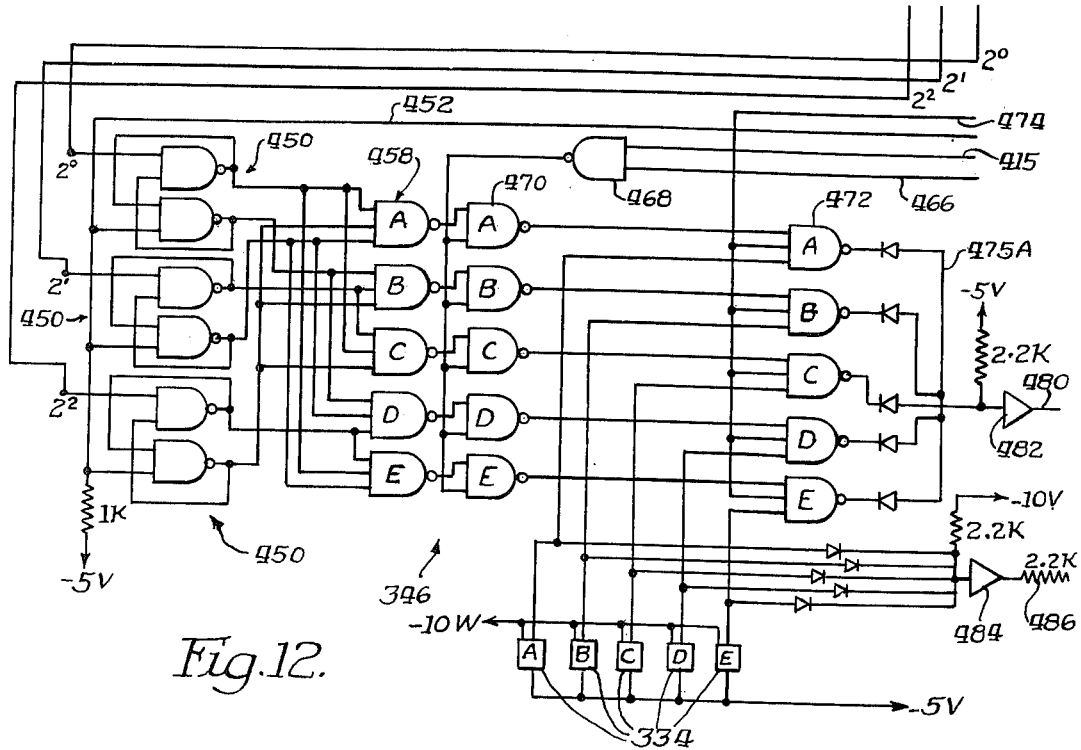
FIG. 12 is another electrical schematic drawing showing the answer decoding logic circuitry of FIG. 10.

Referring to FIG. 11, the sensing means 310 comprises the photodetectors or phot-resistive cells 311 through 318 which change resistance with changes in light falling upon the cells. Each cell 311 through 318 is connected as an element of a voltage divider network, generally designated 400 so that the resistance change of a cell results in a voltage change across the divider. The voltage divider output is connected to one input of an Op-amp 402 which is connected as a comparator. Typically, the Op-amps 402 are one-fourth of a quad OP-amp such as LM324N. Thus, two such quad OP-amps are necessary for the eight cells 311 through 318. All of the resistors, unless otherwise designated, are 10k ohms. The amplifier feedback resistors are 10 megohms. The output of the comparator 402 connected to the enabling cell 311 is connected to the base, of a transistor 404 which provides the minus volt supply to the voltage divider 40 of the cells 312 through 318 when light is impinging the enable cell 311. Thus, the enable cell must be receiving light in order to have any output from the remaining comparators 402. The other comparator input is tied to a source voltage which is equal to the maximum voltage at the divider minus the minimum voltage at the divider, divided by two. More simply, this input is tied to a voltage exactly midway between high and low or 1 and 0 voltage levels. The enable comparator output 41, main output 412, auto-step output 413, branch output 414 and omni-branch/reverse output 415 will go "hi" when light is impinging the respective cell. The output from the answer cells 416, 417 and 418 will go "low" when light is impinging these respective cells.

The enable output 411 is connected to a timer 424 such as an LM322N integrated circuit whose output 426 operates the asynchronous timer 350. The timer 424 is used to interface the slow reaction time of the photoresistive enable cell 311 with the much faster operating TTL logic of the asynchronous timer 350. For the TTL logic of the control means 330, a "hi" or logic level 1, is equivalent to minus 5 volts while a "low" or logic level 0 is equivalent to a minus 10 volts.

The asynchronous timer 350, referring to FIG. 14, includes a pair of integrated circuits 428 and 430. The integrated circuits 428 and 430 are available in a package as shown by the rectangular dash lines 432 such as a DM74L74N IC. The pulses provided by the timer 424 are connected to the clock input 3 of the IC 432. The counter is connected as a modulo-three counter so as to count 1-2-3-1-2-3 etc. The output for $Q_1$ and $Q_2$ will be 0,0; 1,0; 0,1; or 1,1 as successive pulses are received on line 426. The outputs of $Q_1$ and $Q_2$ are connected to a NAND-gate 436 which, when both $Q_1$ and $Q_2$ are "hi" produce an artificial pulse through a NOR-gate 438 and inverter 440 causing the circuit to slip the fourth count. A double-pole start button 441 mounted on the exterior of the housing 24 is depressed to initiate operation of the apparatus 20 by clearing the stop-enable flip-flop 542. For the purposes of this specification, "count 1" is identified as a condition when $Q_1$ is 0 and $Q_2$ is 1. "Count 2" is identified as a condition when both $Q_1$ and $Q_2$ are both 0 and "Count 3" is identified as a condition when $Q_1$ is 1 and $Q_2$ is 0. The counter 432 is on "count 1" when the enable cell is energized by a transparent position 81a or 81b as the apparatus is moving into an informational unit 64. "Count 2" occurs when the position 81c is transparent and the apparatus is stopped on a frame. "Count3" occurs when the position 81a or 81b is sensed when the machine is moving out of a frame. Thereafter, the counter automatically returns to "count 1". As will be described in greater detail hereinafter, "count 1" enables reading and storage of the data in either of the columns 78a or 78b. "Count 2" enables reading and storage of the data in row 78c, and "Count 3" ignores the data since the data being received relates to the film frame which is being moved out of projection. This third count, and the vertical rows of identical data 78a and 78b are necessary since the apparatus can approach a frame from either direction, but upon leaving a frame, the coded data is not necessary.

The answer decoding logic unit 346 is shown in FIG. 12 and includes three set-reset flip-flops 450 each of which has one input connected to lines 416, 417 or 418. The other input for each is connected by line 452 through a 0.01 microfarad capacitor 453 to the output of an inverter 456. Line 426 is connected to the input of the inverter 456 and provides a short reset pulse to the flip-flops 450 allowing them to decode the combination of signals on lines 416, 417 and 418. Th outputs of the set-reset flip-flops 450 are decoded by a bank of five NAND-gates 458 designated a, b, c, d and e which identify on "count 2", the correct answer and on "count 1", one of four possible branch frames. Referring back to FIG. 14, on count 2, $\overline{Q}_1$ is "hi" and $Q_2$ is "low". Both of these inputs are connected to a NAND-gate 460, the output of which is "hi" on "count 2" on line 462 and inverted by inverter 464 to be "hi" on line 466. Line 466 is connected to the input of NAND-gate 468 (FIG. 12) whose output is connected to one input of each of five NAND-gates 470a through 470c. Thus, if cell 316 is illuminated, line 416 will be "low" and the input from the NAND-gate 470 will be "hi" to the NAND-gate 472. Each of the NAND-gates 472a–472e are connected to the respective pushbutton 334a–334e which connects another input to a "hi" when depressed. The NAND-gates 472 each have a third input on line 474 which, as will be described below, is "hi" at the end of the audio reproduction. Thus, if the correct answer button, for this example A is depressed, the output 475a will go "low" and produce a "hi" on line 480. The output of the inverter 482 signifies a correct operator response. Each of the answer button switches 334 are also connected to an inverter 484 which produces a "low" to its output 486. The outputs 480 and 486 are connected to the cell decoding logic unit 344 as shown on FIG. 14.

The cell decoding logic is driven by the comparators corresponding to each of the cells 312, 313, 314 and 315 by the respective comparator outputs on lines 412, 413, 414 and 415. These inputs are connected to a plurality of transmission gates 490. These transmission gates 490 feed data to registers 492M, 492A, 492B and 494R, respectively, where the data is stored. The registered or stored data is then compared with new data from the logic drivers for each command cell as the storage element 50 is scanned. This permits the apparatus to store a frame code and compare successive frame codes to the stored data. The output 494 from the main register 492M is connected to a NAND-gate 496 and the output 498 of the branch register 492b is connected to a NAND-gate 500. The output 502 from the auto-step register 492a is connected to a NAND-gate 504. The output 506 of the reverse register 492R is connected by line 506 to the X-axis drive motor circuitry 354. Another input of the NAND-gates 496 and 500 is connected to the output of the comparators by lines 412 and 414, respectively, to compare the data stored in the registers with the incoming data to permit comparing of a stored frame code with successive frame codes. The comparison is accomplished when line 466 goes "hi" on "count 1" and therefore, the data stored in "count 2" is compared with the data on "count 1" to determine whether to stop on the approaching frame. For example, if the logic is instructed on "count 2" to seek a main frame, the main register 492M is "hi". The fiche is traversed and when a programmed, main frame is entered, the main comparator 402 produces a "hi". This will compare with the "hi" in the main register and result in a match. Then, as will be described later, the motor drive circuits are called and the transport slows to stop on "count 2". The NAND-gate 504 has a second input connected to the "no main" output 508 of the register 494M and provides a match when the auto-step register 492a is "hi" and the apparatus is not seeking a main frame. When line 506 is "hi", referring to FIG. 13, the X-axis motor circuitry 354 and Y-axis motor circuitry 356 are instructed to travel in reverse to the next frame. This operation will be discussed in detail with respect to FIG. 14.

The output of the NAND-gate 496 is connected to a NAND-gate 510, the output of which is inverted by an inverter 512 to a flip-flop, generally designated 514 and finally a NAND-gate 516. The output 518 of the NAND-gate 516 will be "hi", on "count 1", if for example, a main frame "hi" is stored in the register 492M and a main frame is being entered on "count 1". Line 518 is a "slow enable" signal and is connected as one input of a NAND-gate 520. The other inputs of the NAND-gate 520 are $\bar{Q}_1$ and $Q_2$ which are both "hi" on "count 1." Therefore, the output 522 goes "low" and an inverted "hi" is applied to the base of a transistor 523. The transistor is thus saturated and saturates transistor 526. The collector of transistor 526 provides a bias voltage on line 530 to an X-axis drive circuit transistor 532 (FIG. 13) which shifts the motor to a slow mode as will be described in detail hereinafter. The "slow enable" line 518 is also connected to an inverter 536 whose output on line 540 is connected to a flip-flop 542, at the top of FIG. 14. The output 544 of the flip-flop 542 is a "stop enable" connected to NAND-gate 546. The output 548 of and NAND-gate 546 is input to a NAND-gate 550 along with $\bar{Q}_1$ and $\bar{Q}_2$ on "count 2", $\bar{Q}_1$ and $\bar{Q}_2$ are "hi". The load switch 174 through inverter 552 provides a "hi" to the other input of the NAND-gate 546 whose output 548 goes "hi". Thus, the output of the NAND-gate 550 goes "low", in effect turning off transistor 554 which turns off transistor 556. The collector of transistor 556 is connected by line 560 to a transistor 562 thus stopping the motor. The function of transistor 562 will be described with reference to the X-axis motor circuit 354.

The output of NAND-gate 550 is applied to a "555" timer 564 whose output is inverted and applied to the registers 492M, 492B, 492R and 492A to clear the registers at the occurrence of the stop command on "count 2". After a 10 millisecond delay, caused by the 100k resistor 566 and the 0.01 microfarad capacitor 568, a second timer 570 produces a pulse on line 572 which enables all of the new frame codes to be loaded into the registers 492 which are present on "count 2". This sets the logic for the next frame. The same output on line 572 initiating the lefthand track alignment circuit 538 in FIG. 15. Asynchronous timing then takes over until an answer button is pushed.

The X-axis motor drive circuit is shown in the top of FIG. 13, designated 354. Because the storage element 50 is scanned in a zig-zag or serpentine fashion, it is necessary that the X-motor circuit 354 be aware of what horizontal row 70 is being projected. The odd-even switch 196 identifies whether the apparatus is scanning an odd or even row. In the forward mode, the apparatus scans to the right as projected on the screen and on an even row, scans to the left. In the reverse mode, the directions are reversed for odd and even rows. A decoder logic interfacing with the reverse register 492 on line 506 determines whether or not the apparatus is in a forward or reverse mode. A flip-flop 576 connected to the switch 196 decodes the odd or even signal and combined with four NAND-gates 578 connected to the input line 506, determines the direction of rotation of the X-motor 178. The output of the four NAND-gates 578 are connected to a pair of NAND-gates 580 which, through a pair of AND-gates 582 are connected to inverting and non-inverting inputs of an amplifier 584. Thus, the output 586 of the amplifier 584 can be either approximately plus or minus 10 volts and is connected across the X-motor terminals for driving the motor.

As briefly described previously, the asynchronous timer controls the mode of the X-motor whether to operate at full speed, a reduced speed, or a stop mode. The output of the servo-amplifier 584 is constant with forward or reverse operation so that there is a positive (forward) voltage or negative (reverse) voltage at the output of the servo-amplifier at all times depending upon the mode of operation. As described, the transistor 562 is in a bridge circuit on one leg of the motor 178. If the transistor is "on", the circuit will pass motor current to ground and the motor will run at full speed. The second transistor 532 is part of a second bridge circuit 590 across the motor terminals. When this transistor is turned "on", as described previously, in "count 1", a very low impedance is placed across the motor terminals, and therefore most of the drive current to the motor passes through the bridge. This acts to slow the motor in two ways. First, the drive voltage is reduced by a factor of approximately 6, from 10 volts at full speed to 1.6 volts at slow mode. Secondly, a very low impedance is placed in shunt with the motor so that the CEMF of the motor acts to brake the motor. This becomes particularly important upon removal of the voltage drive by turning transistor 562 "off" at "count 2". The CEMF feedback works as an instantaneous brake and immediately stops the motor to assure proper alignment of the projected data onto the sensing means 310. As described previously, the rectangular box 178 designating the X-motor includes a precaution or fail-safe system similar to that shown in the bottom of FIG. 13 with respect to the Y-motor. These limit switches 160 and 166 are mounted on the end of the X-axis travel and are automatically open if the table overtravels. The diodes in the center legs of each switch allow only an approprite voltage to be applied to the X-motor 178 so as to back the carriage away from the end of travel. A pair of push-buttons, generally designated 594 are provided for manual table positioning and a similar pair of pushbuttons 596 are provided for the Y-motor as will be described below.

The Y-axis drive motor circuitry 356 is shown in the bottom of FIG. 13. The forward and reverse control of the Y-motor is less complicated than above for the X-motor because there is no need to compensate for odd or even rows. For the Y-motor, forward is down on the storage element 50 while reverse is up. The Y-motor circuitry 356 is a true positional servo-system with both rate and positional feedback amplifiers. A position feedback servo-amplifier 602 provides an appropriate drive voltage directly to the motor terminals. Again, the ground leg of the Y-motor 138 includes a bridge circuit 604 and transistor 606 which eliminates drive voltage to the motor on "count 2" as described above. The positioning cell 216 controls the operation of the Y-axis motor. The cell includes two photo-resistive elements which align with the top projected optical sound track 68a. The function of this photocell is to track the upper optical sound track while the X-motor is traversing the storage element 50 across a horizontal row 70. As seen in FIG. 13, the top element is connected to the forward input of the servo-amplifier 602 while the bottom element is connected to the reverse (inverted) input of the servo-amplifier 602. Therefore, if the track begins to stray from alignment on the positioning cell, the servo-amplifier 602 applies an appropriate voltage to correct the misalignment. In order to provide a faster response for alignment, a pair of rate amplifiers 610 and 612 are also connected to the respective cell outputs. Appropriate capacitors and resistors provide a differential output corresponding to the rate of change of the position and the amplified rate of change is applied to the servo-amplifier to produce a voltage which will quickly counter the misalignment of the optical sound track image. Although, in the preferred embodiment, the upper sound track 68a is continuous across the length of a horizontal row, the rate and positional feedback amplifiers 602, 610 and 612 can provide the necessary voltage to the Y-axis drive motor to correct for a 1/10" offset in only a few milliseconds.

An end of row detector, generally designated 614, includes the switches 161 and 170 provide a "hi" to point S when the carriage has reached the right or left end of a row. Point "S" is connected to a timer 616, such as an LM322, which performs two functions. The inverted output through an inverter 618 is connected to point "T" of the comparator 402 for the enable cell which disables the enable cell. The enable cell is disabled at this point since the Y-axis motor is about to be energized, and the enable cell will see the sound track for the next horizontal row. The "hi" at point "S" on line 620 drives the timer 616, which disables the positioning cell 216 for a period of 50 milliseconds. The same signal on line 620 through NAND-gate 622 is inverted and input to the AND-gates 600 which then drives the Y-motor in the appropriate forward or reverse direction. The timer 616 disables the positioning cell 316 by "turning off" the DC voltage to the cell. However, after the 50 milliseconds interval, the positioning cell 216 is again energized and stops the Y-motor when aligned with the next sound track 68. The Y-motor circuit 356 includes the limit switches 150 which prevent mechanical overrun.

The sound track alignment circuit 358 as stated before is energized by a "hi" on line 572 at the beginning of "count 2". The pulse on line 572 fires an SCR 630 after approximately a 30 millisecond delay which energizes the tilt motor 262. The tilt motor 262 drives the cam 260 which begins to move the sound track transducer 210 upwardly toward the sound track. The sound track transducer 210 is a photo Darlington transistor having a gain of approximately 20,000. As the sound track transducer 210 aligns with the projected image of the optical sound track 68, a voltage is applied to the non-inverting input of an amplifier 632. The output of the amplifier 632 is connected to an adaptive threshold RC circuit, generally designated 634, which continues to provide current to the tilt motor 262 until the midpoint of the sound track is reached. At that point, a transistor 638 disconnects the tilt motor 262 from the 6 volt power supply. The guide bars 222 and 224 for the sound track transducer 210 are then in proper alignment or azimuth for audio reproduction. The proper azimuth is necessary for reproduction of audio frequencies over 2000 Hz which is necessary since the upper frequency limit of the system is approximately 3600 Hz. After scanning to the right and back to the left of a particular sound track, the tilt motor 262 is again energized until the switch 270 opens. In order to permit restarting of the tilt motor 262, the cam and motor armature are designed to permit the cam 260 to coast slightly past its low point to permit the switch 270 to again close. However, at this point, the tilt motor 262 will not restart until the SCR 630 is again fired. Total alignment time for the sound track transducer 210 is approximately two seconds and, after the sound track is scanned, it is repositioned at its lowestmost point.

The output from the amplifier 636 on line 640 initiates scanning of the audio cell whose circuit is shown at 360. An inverter 642 applied the voltage to a NAND-gate 644 which produces a "hi" output 646. An inverter 650 provides a "low" input to flip-flop 652 producing a "low" on line 654 which corresponds to a forward or righthand movement of the sound track transducer. The "low" is applied to another flip-flop 656 in series with a pair of gates 658 and inverters 660 connected to the inverting and non-inverting terminals of an amplifier 662. The output of the amplifier 662 is connected to the scan motor 280 which moves the sound track transducer toward the right. The sound track transducer continues to move toward the right until it intercepts the image being received by the positioning cell 216. When the light to the positioning cell 216 is cut off by the sound track transducer 210, transistors 624 and 626 "turn off" causing line 664 to go "hi". The input to the non-inverting terminal of an amplifier 666 goes "hi" and the "hi" output 668 is applied to one input of a NAND-gate 670. The other input of the NAND-gate 670 is "hi", from flip-flop 652 thus resetting the flip-flop 656 and reversing the scan motor 280 to drive the sound track transducer in the opposite direction. Thereafter, the positioning cell is again receiving projected light and therefore line 664 goes low. The sound track transducer continues to the left until it reaches the end of its travel and is mechanically stopped. An amplifier 672 connected across the terminals of the current sensing resistor 281 senses an excessive amount of current (250 milliamps) when the transducer 210 is mechanically stopped. A scan cell shutdown comparator 672 produces an output on line 674 sending the amplifier 662 output to zero. The circuit then awaits the next pulse from the lefthand track alignment circuit.

While the sound track transducer is scanning, the output of the photo Darlington 210 is transmitted through a shielded cable 680 in line 682 to the audio amplifier 362. The audio amplifier is a basic circuit that processes the signal from the photo Darlington 210. The amplifier 690 is turned on as the flip-flop 652 provides a "hi" on line 684 which saturates transistors 686 and 688. The collector of transistor 688 is connected to point Q which turns on a first amplifier 690. The output of amplifier 690 is connected through a volume control 692 to a power amplifier 694. The output of amplifier 694 drives the speaker 696 with the amplified audio signal.

At the end of the sound track transducer scan, line 684 again goes "low" shutting off the audio amplifier. Line 684 also is connected to the asynchronous timer. Line 684 carries an end of audio pulse which may be delayed by an optional delay provided by a capacitor 700. The output on 684 is connected to an amplifier providing a "hi" on line 702. Line 702 is connected to one input of a NAND-gate 704 the other of which receives a "hi" on "count 2", thus providing a low on line 706 to a NAND-gate 708. The output of the NAND-gate 708 is connected to an AND-gate 710 having a second input on line 712 from the register 492a which is "hi" if the present frame is not an auto-step frame. The output 714 of AND-gate 710 goes "hi" driving a timer 716. The timer 716 at this point then provides a "hi" on line 474 which enables the NAND-gates 472 to receive a response from one of the operator switches 334. Thus, the only time in which an operator can respond is at the end of the audio signal.

As described above, a correct response provides a "hi" on line 480 while an incorrect response provides a "low" on line 480. The output 480 is connected to a NAND-gate 726 receiving the inverted output of NAND-gate 550 when the apparatus is stopped. The third input is "hi" when any answer button is depressed. The "low" output is inverted and acts through NOR-gate 491M to generate a main in the main register. This causes the apparatus to seek the next main frame. This will always occur when a correct response is received for a particular main frame.

On the other hand, if an incorrect response was received, line 480 will be "low" and not generate the main. If, on a wrong answer, and the branch register 492b output is "hi" to NAND-gate 500, the X-motor will be called and begin traversing. Since the auto-step register 492a and the main register 492M are low, the apparatus will be seeking the branch frame. If it approaches a subsequent frame, and the omni-branch position 85a or 85b is transparent, line 415 goes "hi" and through NAND-gate 468 produces "hi"s at the outputs of all of the gates 470 causing the X-motor to stop on "count 2". If the omni-branch position 85a or 85b is opaque and the position 84a or 84b is transparent, the approaching frame will be identified as a branch frame. However, there may be up to four branch frames, each of which corresponds to a particular incorrect response. Thus, the answer codes 86, 87 and 88a or b are read and decoded by the answer cell decoding logic 346. The incorrect operator response, as described previously, is retained by a mechanical latch 340 on the pushbuttons 334 providing a "hi" to one of the NAND-gates 472. The depressed answer button 334 is thus compared with the approaching answer codes on the branch frame, and if there is a match, the X-motor is called to stop on "count 2". Since at least one of the buttons 334 is depressed, it is conceivable that the machine will traverse three branch frames before finally stopping on the fourth branch frame that satisfies the correct answer code.

After a correct branch frame is identified, either an omni-branch frame or a branch frame satisfying the answer code required, the response buttons 334 must be released. The response buttons 334 are released by a solenoid 345 (bottom of FIG. 14) which is actuated by the discharge of capacitor 343. When a button 334 is depressed, line 486 is "low" and the output of inverter 724 goes "hi". This is input to a NAND-gate 726 and another NAND-gate 727. Referring back to FIG. 14, when the base of transistor 523 goes "hi", point "K" on line 730 additionally goes "hi" when the X-motor is called to stop, which is connected through a 47k resistor to the base of a transistor 732. Transistor 732 saturates thus applying a bias to the base of transistor 734 which saturates, energizing the solenoid 345 and releasing the buttons.

Similarly, the end of audio line 702 is connected to a NAND-gate 736 having a "hi" input on line 738 from the inverter 724 which is "hi" when a button is depressed. A third input 740, which is "hi" when the branch register 492 is "low", produces an output 744 which is low and inverted by inverter 746 to similarly fire the solenoid. That is to say, the mechanical latch of the buttons 334 is released at the end of the audio signal when any answer button has been depressed and there is no branch frame to go to.

An additional NAND-gate 750 is connected to the output 740 and the inverted output of the NAND-gate 727 to produce a "low" on line 648 when we have a wrong answer and no branch frame is available which will enable the audio cell scan through NAND gate 644.

In the auto-step, on count 2, $\overline{Q}_1$ is "hi" and $\overline{Q}_2$ is "hi" which, through NAND-gate 752, provides a "low" output to NAND-gate 754. The other input to NAND-gate 754, from NAND-gate 460 is "low" on "count 3" producing a "hi" output 756. This output is applied to a NAND-gate 758 receiving the output of NAND-gate 504. The low output 760 through NAND-gate 516 causes the X-drive motor to stop on this auto-step frame.

The above description both with respect to the mechanical elements and the electronic control means as provided herein as an explanation of the operation of one teaching apparatus 20 which embodies the concept of the present invention. It will be obvious to those skilled in the art that many changes to either the electronic or mechanical elements or the programming format can be made without departing from the spirit and scope of the present invention. For example, all of the programming codes, rows 78a, 78b and 78c could be placed on one side of the visual image 66 and may even include additional positions for storing additional data. For example, if one additional answer code position were added at the bottom of each column 78, and an additional answer cell were provided for the electronics, the number of possible answers could be increased to 15 with only minor changes to the associated logic circuitry. Additionally, in lieu of the mechanical latch on the switches 334, an electronic memory could be utilized to store a particular incorrect operator response and provide similar branching to specific related frames. Therefore, the foregoing detailed description is to be understood to have been given clearness of understanding only and no unnecessary limitations should be understood therefrom as many modifications and alterations will be obvious to those skilled in the art.

We claim:

1. An audio reproduction device, comprising:
   a frame;
   a storage element having an optical sound track portion representing audio information for mounting on the frame;
   a guide rail secured to the frame;
   an optical sound track transducer slidably mounted on said guide rail;
   projection means for projecting the optical sound track from the storage element onto the sound track transducer;
   drive means for moving said sound track transducer with respect to said projected optical sound track;
   means for maintaining alignment of said guide rail with respect to the optical sound track, said alignment means comprising a pivotal mounting on one end of said guide rail and cam means connected to the other end of said guide rail for alignment thereof with respect to said optical sound track; and
   audio amplifier means connected to said sound track transducer for reproducing audio information.

2. The device of claim 1 wherein said alignment means further includes means for aligning one end of said optical sound track with the pivotal end of said guide rail.

3. An audio visual teaching device, comprising:
   a frame having a projection screen mounted thereon;
   a storage element including a visual record portion and an optical sound track portion representing audio information;
   a guide rail secured to said frame;
   an optical sound track transducer slidably mounted on said guide rail;
   projection means for projecting the visual record portion onto the projection screen and for projecting the optical sound track onto the sound track transducer;
   drive means for moving said sound track transducer with respect to said projected optical sound track;
   means for maintaining alignment of said guide rail with respect to said optical sound track, said alignment means comprising pivotal mounting means on one end of said guide rail and cam means connected to the other end of said guide rail for alignment thereof with respect to said optical sound track; and
   an audio amplifier connected to said sound track transducer for reproducing audio information.

4. The device of claim 3 wherein said alignment means further includes means for aligning one end of said optical sound track with the pivotal end of said guide rail.

5. A programmable audio visual teaching system, comprising:
   a storage element bearing a plurality of informational units, each informational unit including a visual record portion and a correlated optical sound track portion;
   projectible encoded programs on said storage element related to each of said informational units;
   a frame, including a carriage for mounting said storage element;
   a projection screen and sensing means mounted on the frame;
   a guide rail secured to said frame;
   a sound track transducer slidably carried by said guide rail;
   projection means for projecting the visual record portion onto the projection screen and the projectible encoded programs onto said sensing means, and for projecting the optical sound track onto said sound track transducer;
   carriage positioning means for moving said storage element with respect to said projection means to project a predetermined one of said informational units and related projectible encoded programs;
   transducer drive means for moving said sound track transducer with respect to said projected optical sound track;
   means for aligning said guide rails with respect to said optical sound track, said aligning means comprising pivotal mounting means on one end of said guide rail and cam means connected to the other end of said guide rail for alignment thereof with respect to said optical sound track;
   audio amplifier means connected to said sound track transducer for audibly reproducing said sound track;
   a plurality of operator responsive selection means for selective actuation by the operator in response to received information from some of said informational units; and
   control means responsive to said sensing means for controlling said carriage positioning means to project another informational unit in accordance with the encoded program and the operation of said selection means.

6. The system of claim 5 wherein said alignment means further includes means for aligning one end of said optical sound track with the pivotal end of said guide rail.

7. Audio visual teaching apparatus, comprising:
   a frame having a projection screen mounted thereon;
   a storage element including one or more informational units, each informational unit including a visual record portion and an optical sound track portion;
   means for transducing the optical sound track, said transducing means comprising adjustable guide means carried by said frame and an optical sound track transducer slidably mounted on said adjustable guide means;
   projection means for projecting the visual record portion onto the projection screen and for projecting the optical sound track onto said optical sound track transducer;
   drive means for moving said optical soundtrack transducer with respect to said projected optical sound track;
   means responsive to said transducing means for audibly reproducing the optical sound track; and aligning means for positioning said adjustable guide means with respect to said optical sound track.

8. The audio visual teaching apparatus of claim 7 wherein said adjustable guide means comprises a generally lineal track member pivotally mounted with respect to said frame and said aligning means comprises adjustment drive means for pivoting a first end of said track means to align said first end with the corresponding end of said projected optical sound track.

9. The audio visual teaching apparatus of claim 8 wherein said optical sound track transducer is initially positioned at said first end, and said adjustment drive means is responsive to said optical sound track transducer.

10. The audio visual teaching apparatus of claim 9 further comprising carriage positioning means for moving said storage element with respect to said projection means.

11. The audio visual teaching apparatus of claim 10 further comprising alignment sensing means secured at a second end of said track member and means responsive to said alignment sensing means for controlling said carriage positioning means.

12. The audio visual teaching apparatus of claim 7 wherein said adjustable guide means comprises a track member, said aligning means further comprising pivotal mounting means at a first end of said track member and cam means connected to the other end of said lineal track member.

13. The audio visual teaching apparatus of claim 7 wherein said adjustable guide means comprises a guide track, said optical sound track portion comprising at least two spaced apart track elements, and said transducing means comprising means for moving said optical sound track transducer in a direction generally transverse to said guide track and for selectively aligning said optical sound track transducer with respect to said track elements.

14. An audio visual system, comprising:
a frame having a projection screen attached thereto;
a storage element including one or more informational units, each informational unit including a visual record portion and an optical sound track portion;
means for transducing the optical sound track comprising a movable sound track transducer;
projection means for projecting an enlarged image of the visual record portion onto the projection screen and for projecting an enlarged image of the optical sound track onto said sound track transducer;
drive means for moving said sound track transducer with respect to said projected optical sound track; and
means responsive to said sound track transducer for audibly reproducing the optical sound track.

15. The audio visual system of claim 14 wherein said projected visual record image and said projected optical sound track image are enlarged by substantially the same enlargement factor.

16. The audio visual system of claim 14 wherein said transducing means and said projecting screen are generally disposed in the same plane.

17. An audio visual reproduction system, comprising:
a frame having a projection screen mounted thereon;
a storage element including one or more informational units, each informational unit including a visual record portion and an optical sound track portion;
adjustable means for transducing the optical sound track comprising a movable sound transducer element;
means for projecting an enlarged image of the visual record portion onto said projection screen and for projecting an enlarged image of the optivcal sound track onto said adjustable sound track transducing means;
drive means for moving said sound transducer element with respect to said projected optical sound track;
means responsive to said sound transducer element for audibly reproducing the optical sound track; and
alignment means for adjusting said adjustable sound track transducing means with respect to said optical sound track.

18. The audio visual system of claim 17 wherein said projected visual record portion and said projected optical sound track are enlarged by substantially the same enlargement factor.

19. The audio visual system of claim 17 wherein said transducing means and said projection screen are generally disposed in the same plane.

20. The audio visual system of claim 17 wherein said adjustable sound track transducing means comprises a lineal guide track and said alignment adjusting means comprises adjustment drive means for positioning a first end of said guide track to align said first end with the corresponding end of said projected optical sound track.

21. The audio visual system of claim 20 wherein said movable transducer element is initially positioned by said drive means at said first end and said adjustment drive means is responsive to said movable transducer element.

22. The audio visual system of claim 21 further comprising carriage positioning means for moving said storage element with respect to said projection means.

23. The audio visual system of claim 22 further comprising alignment sensing means carried at a second end of said guide track and means responsive to said alignment sensing means for controlling said carriage positioning means.

24. The audio visual system of claim 20 wherein said alignment adjustment means further comprises pivotal mounting means at said first end of said guide track and cam means connected to the other end of said guide track.

25. The audio visual system of claim 17 wherein said adjustable transducing means comprises a guide track, said optical sound track portion comprising at least two spaced apart track elements, and said adjustable transducing means comprising means for moving said movable sound transducer element in a direction generally transverse to said guide track and for selectively aligning said movable sound transducer element with respect to said guide track.

26. A programmable audio visual teaching system, comprising:
a storage element bearing a plurality of informational units, each informational unit including a visual record portion and a correlated optical sound track portion;
projectable encoded programs on said storage element related to said informational units;

a frame;

a projection screen and program sensing means mounted on said frame;

means for transducing the optical sound track comprising a movable transducer element;

means for simultaneously projecting an enlarged image of the visual record portion onto said projection screen, an enlarged image of said optical sound track onto said transducing means and an enlarged image of said related encoded program onto said program sensing means;

carriage positioning means for mounting said storage element and for moving said storage element with respect to said projection means to project a predetermined one of said informational units and related projectable encoded programs; and control means responsive to said sensing means for controlling said storage element moving means for projection of predetermined informational units and related encoded programs.

27. The programmable audio visual teaching system of claim 26 further comprising a plurality of operator responsive selection means for selective actuation by the operator in response to received information from said informational units.

28. The programmable audio visual teaching system of claim 26 wherein said transducing means, said projection screen and said program sensing means are generally disposed in the same plane.

29. The system of claim 26 wherein said projectible encoded program for each informational unit is positioned on the storage element adjacent the related unit.

30. The system of claim 29 wherein each projectible encoded program includes first data identifying the informational unit and second data identifying the subsequent instructional unit to be projected.

31. The system of claim 30 wherein said second data includes a first subgroup and a second subgroup, said control means being responsive to said first subgroup to automatically project the subsequent informational unit and responsive to said second subgroup to project a predetermined subsequent informational unit in response to the operation of the selection means.

32. The system of claim 31 wherein the first subgroup of said second data further includes a first portion directing the control means to project a first subsequent informational unit from a plurality of acceptable units in response to operation of any of the selection means and a second portion for directing the control means to project a particular one of said subsequent informational units in accordance with the particular selection means actuated by the operator.

33. The audio visual teaching system of claim 26 wherein said informational units are arranged on said storage elements in a sequence corresponding to a branched learning format.

34. The audio visual teaching system of claim 26 wherein said storage element comprises a microfiche comprising a plurality of rectangular coordinate rows of informational units.

35. The audio visual teaching system of claim 26 wherein said carriage positioning means includes an X-drive motor and a Y-drive motor for moving the carriage in orthogonal directions.

36. The audio visual teaching system of claim 35 wherein said carriage positioning means further includes a photodetector mounted adjacent the projection screen connected to said Y-drive motor to maintain alignment of the informational units in the respective rows.

37. Programmable audio visual apparatus, comprising:

a storage element including a plurality of informational units in a predetermined array, each informational unit including a visual record portion, a correlated optical sound track portion and a correlated projectable encoded program;

a frame;

a projection screen and program sensing means mounted on said frame;

means for transducing the optical sound track comprising a movable transducing element;

means for projecting an image of said visual record portion onto said projection screen, an image of said correlated optical sound track onto said transducing means and an image of said correlated encoded programs onto said program sensing means;

means for positioning said storage element with respect to said projection means to project a predetermined one of said informational units; and control means responsive to said program sensing means for controlling said storage element positioning means;

each of said projectable encoded programs including at least two coded data arrays being arranged in the same format and being arranged at predetermind positions on said informational units, said program sensing means including detecting means arranged in the same format as said coded data arrays, a first of said coded data arrays being arranged on each of said informational units to be projected onto said detecting mans when the storage element positioning means is stationary and the other coded data arrays being projected onto said detecting means during movement of said storage element.

38. The programmable audio visual apparatus of claim 37 wherein each of said coded data arrays includes a predetermined number of coded data elements, a predetermined one of said data elements in each of said coded data arrays comprising an enable data bit, said detecting means comprising a plurality of detector elements equal to said predetermined number of coded data element, said control means being enabled by the detector element corresponding to said enable data bit.

39. The programmable audio visual apparatus of claim 38 wherein said positioning means is operative in a reverse mode and a forward mode.

40. The programmable audio visual apparatus of claim 39 wherein each of said projectable encoded programs includes three coded data arrays, said first coded data array provides identification and operational data related to the informational unit being projected and said second and third coded data arrays represent identification and operational data related to the next informational units to be positioned with respect to said projecting means by said positioning means in said forward and reverse modes respectively.

41. The programmable audio visual apparatus of claim 37 further comprising a plurality of operator responsive selection means for selective actuation by the operator in response to the presentation of the informational unit.

42. The programmable audio visual apparatus of claim 41 wherein a predetermined portion of said first coded data array represents the correct response to the projected informational unit.

43. The programmable audio visual apparatus of claim 42 wherein the particular selector means actuated by the operator represents the identity of a subsequent informational unit to be projected subsequent to an incorrect response.

44. The programmable audio visual apparatus of claim 41 wherein said control means comprises means responsive to said coded data array and said operator responsive selection means for identifying the subsequent informational unit to be projected.

45. The programmable audio visual apparatus of claim 44 wherein each of said informational units is characterized bfy one of a predetermined number of categories, said coded data arrays include data representing the category of the subsequent informational unit to be projected.

46. The programmable audio visual apparatus of claim 38 wherein said detector element corrresponding to said enable data bit is disposed at a predetermined position in said program sensing means, said predetermined position corresponding to a position at which no other image is projected from said visual record positions or said optical sound track positions while said storage element is either moving or stationary.

* * * * *